(12) United States Patent
     Kim et al.

(10) Patent No.:     US 12,561,051 B2
(45) Date of Patent:        Feb. 24, 2026

(54) DISPLAY APPARATUS AND METHOD FOR CONTROLLING THE SAME

(71) Applicant: SAMSUNG ELECTRONICS CO., LTD., Suwon-si (KR)

(72) Inventors: Sunyoung Kim, Suwon-si (KR); Hyuntae Kim, Suwon-si (KR); Dongho Lee, Suwon-si (KR); Jaewon Jung, Suwon-si (KR); Jisoo Kim, Suwon-si (KR); Sooyeoun Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 264 days.

(21) Appl. No.: 17/989,889

(22) Filed: Nov. 18, 2022

(65) Prior Publication Data

US 2023/0205408 A1      Jun. 29, 2023

Related U.S. Application Data

(63) Continuation of application No. PCT/KR2022/016064, filed on Oct. 20, 2022.

(30) Foreign Application Priority Data

Dec. 28, 2021     (KR) ........................ 10-2021-0189348

(51) Int. Cl.
     *G06F 3/04845*          (2022.01)
     *G06F 3/0362*           (2013.01)
(52) U.S. Cl.
     CPC ........ *G06F 3/04845* (2013.01); *G06F 3/0362* (2013.01)
(58) Field of Classification Search
     CPC ........................... G06F 3/04845; G06F 3/0362
     See application file for complete search history.

(56) References Cited

U.S. PATENT DOCUMENTS

| | | | |
|---|---|---|---|
| 9,612,733 | B2 | 4/2017 | Kim et al. |
| 10,210,598 | B2 | 2/2019 | Patankar et al. |

(Continued)

FOREIGN PATENT DOCUMENTS

| | | |
|---|---|---|
| KR | 10-2011-0036632 | 4/2011 |
| KR | 10-1270343 B1 | 5/2013 |

(Continued)

OTHER PUBLICATIONS

International Search Report dated Feb. 15, 2023 issued in PCT Application No. PCT/KR2022/016064.

(Continued)

*Primary Examiner* — Michelle Chin
(74) *Attorney, Agent, or Firm* — STAAS & HALSEY LLP

(57)          ABSTRACT

A display apparatus includes a display; a receiver configured to receive a signal from an external input device including a control knob; at least one memory storing instructions; and at least one processor electrically connected to the display and the receiver, and which executes the stored instructions. The at least one processor displays a first content image on the display, display a rotation of the control knob of the external input device and a size of the first content image on the display based on the received signal corresponding to a user input which is input through the external input device, and change a size of the first content image and display the changed size of the first content image on the display, based on at the received signal corresponding to the rotation of the control knob of the external input device.

16 Claims, 27 Drawing Sheets

(56) References Cited

U.S. PATENT DOCUMENTS

| | | | |
|---|---|---|---|
| 10,331,239 B2 | 6/2019 | Grant et al. | |
| 10,721,430 B2 | 7/2020 | Oh et al. | |
| 11,630,527 B2 | 4/2023 | Kim et al. | |
| 11,681,430 B2 | 6/2023 | Choi et al. | |
| 11,696,018 B2 | 7/2023 | Li et al. | |
| 2002/0148317 A1* | 10/2002 | Onodera | G05G 9/047 |
| | | | 74/471 XY |
| 2010/0057761 A1 | 3/2010 | Nolhage et al. | |
| 2010/0079494 A1 | 4/2010 | Sung et al. | |
| 2011/0037725 A1* | 2/2011 | Pryor | G06F 3/03545 |
| | | | 345/173 |
| 2011/0267291 A1 | 11/2011 | Choi et al. | |
| 2013/0342454 A1 | 12/2013 | Choi et al. | |
| 2015/0130759 A1* | 5/2015 | Heo | G06F 3/0482 |
| | | | 345/174 |
| 2015/0177848 A1 | 6/2015 | Jung et al. | |
| 2016/0004414 A1* | 1/2016 | Kim | G06F 3/04845 |
| | | | 345/163 |
| 2016/0042494 A1* | 2/2016 | Baek | H04N 5/445 |
| | | | 348/468 |
| 2018/0081453 A1* | 3/2018 | Ely | G06F 3/0482 |
| 2018/0199001 A1 | 7/2018 | Lim et al. | |
| 2019/0265801 A1 | 8/2019 | Yildiz et al. | |
| 2021/0261001 A1* | 8/2021 | Choi | B60K 35/10 |

FOREIGN PATENT DOCUMENTS

| | | |
|---|---|---|
| KR | 10-1291616 | 8/2013 |
| KR | 10-2016-0004630 | 1/2016 |
| KR | 10-2016-0085189 A | 7/2016 |
| KR | 10-2016-0149141 | 12/2016 |
| KR | 10-2017-0107753 | 9/2017 |
| KR | 10-1779858 | 9/2017 |
| KR | 10-2017-0132693 | 12/2017 |
| KR | 10-2161565 | 10/2020 |
| KR | 10-2021-0064330 | 6/2021 |
| KR | 10-2395970 | 5/2022 |

OTHER PUBLICATIONS

Written Opinion dated Feb. 15, 2023 issued in PCT Application No. PCT/KR2022/016064.

Supplementary European Search Report dated Sep. 9, 2024 issued in EP Application No. EP 22 91 6337.

* cited by examiner

DISPLAY APPARATUS AND METHOD FOR CONTROLLING THE SAME

CROSS-REFERENCE TO RELATED APPLICATION

This application is a continuation application, under 35 U.S.C. § 111(a), of international application No. PCT/KR2022/016064, filed on Oct. 20, 2022, which claims priority under 35 U. S. C. § 119 to Korean Patent Application No. 10-2021-0189348 filed on Dec. 28, 2021, the disclosure of which is incorporated herein by reference in its entirety.

BACKGROUND

1. Field

The disclosure relates to a display apparatus and method for controlling the same, and more particularly, to a display apparatus including an external input device and a method for controlling the display apparatus.

2. Discussion of Related Art

In general, display apparatuses are an output device for visually presenting image information received from outside or stored inside for the user, and are used in various areas such as homes or businesses.

The user usually watches the display apparatus at a certain distance from the display apparatus. It is common for the display apparatus to include an external input device for the user to remotely manipulate the display apparatus.

Traditionally, the external input device of the display apparatus usually includes up, down, left and right direction keys. The user uses the up, down, left and right direction keys to change channels and/or volume, set brightness, contrast or definition of the display apparatus, or set color or gamma values of the display apparatus.

SUMMARY

The disclosure provides a display apparatus including a remote control device equipped with a control knob and four-directional keys arranged in the middle of the control knob, and a method for controlling the display apparatus.

According to an aspect of the disclosure, a display apparatus includes a display; a receiver configured to receive a signal from an external input device including a control knob of the external input device; at least one memory storing instructions; and at least one processor electrically connected to the display and the receiver, which executes the stored instructions. The at least one processor may be configured to display a first content image on the display, display a rotation of the control knob of the external input device of the external input device and a size of the first content image on the display based on the received signal corresponding to a user input which is input through the external input device, and change the size of the first content image and display the changed size of the first content image on the display, based on the signal corresponding to the rotation of the control knob of the external input device.

The at least one processor may further configured to scale down the first content image displayed on the display and display the scaled-down size of the first content image on the display, based on the received signal corresponding to a first directional rotation of the control knob of the external input device, and scale up the first content image and display the scaled-up size of the first content image on the display, based on the received signal corresponding to a second directional rotation of the control knob of the external input device.

The at least one processor may further configured to display a second content image by not overlapping with the first content image on the display, and scale up the first content image and scale down the second content image so that the first content image does not overlap the second content image, based on the received signal corresponding to the second directional rotation of the control knob of the external input device.

The at least one processor may further configured to display a second content image by not overlapping with the first content image on the display, and scale up the first content image so that the first content image overlaps with the second content image, based on the received signal corresponding to the second directional rotation of the control knob of the external input device.

The at least one processor may further configured to move down the first content image based on the received signal corresponding to the first directional rotation of the control knob of the external input device, and move up the first content image based on the received signal corresponding to the second directional rotation of the control knob of the external input device.

The at least one processor may further configured to display a second content image by not overlapping with the first content image on the display, and move the first content image and scale down the second content image so that the first content image does not overlap the second content image, based on the received signal corresponding to a rotation of the control knob of the external input device.

The at least one processor may further configured to display a second content image by not overlapping with the first content image on the display, and move the first content image so that the first content image overlaps with the second content image, based on the received signal corresponding to a rotation of the control knob of the external input device.

The at least one processor may further configured to display at least one of a plurality of directional keys included in the external input device and an aspect ratio of the first content image on the display based on the received signal corresponding to the user input which is input through the external input device, and change the aspect ratio of the first content image and display the changed aspect ratio of the first content image on the display based on the received signal corresponding to at least one input of the plurality of directional keys of the external input device.

The at least one processor may further configured to display a multi-view guide for displaying a plurality of content images on the display, based on the received signal corresponding to at least one input of a plurality of directional keys included in the external input device, wherein the multi-view guide comprises a plurality of source images associated with a plurality of content sources, respectively.

The at least one processor may further configured to display a second content image by not overlapping with the first content image based on the received signal corresponding to a source image selected from among the plurality of source images.

The at least one processor may further configured to display the first content image received from a first content source on the display, and display a second content image received from a second content source by not overlapping with the first content image on the display, based on the received signal corresponding to a connection to the second content source.

The at least one processor may further configured to move the first content image up, down, to a right side or to a left side, based on at least one input of a plurality of directional keys included in the external input device.

The at least one processor may further configured to display a parameter guide for modifying an image parameter of the first content image based on the received signal corresponding to at least one input of a plurality of directional keys included in the external input device, wherein the parameter guide comprises a plurality of parameter guides associated with a plurality of image parameters, respectively.

The at least one processor may further configured to change a setting value of each of the plurality of parameter guides based on the received signal corresponding to a rotation of the control knob of the external input device.

According to an aspect of the disclosure, a method of controlling a display apparatus which receives a signal from an external input device including a control knob of the external input device may include displaying a first content image received from a first content source; displaying a rotation of the control knob of the external input device and a size of the first content image based on the received signal corresponding to the user input through the external input device; and changing the first content image and displaying the changed size of the first content image based on the received signal corresponding to the rotation of the control knob of the external input device.

According to an aspect of the disclosure, a display apparatus includes a display; a receiver configured to receive a signal from an external input device including a circular touch pad; at least one memory storing instructions; and a at least one processor electrically connected to the display and the receiver, and which executes the stored instructions. The at least one processor may configured to display a first content image on the display, display a rotation of the control knob of the external input device and a size of the first content image on the display based on the received signal corresponding to the user input which is through the external input device, and change the size of the first content image and display the changed size of the first content image on the display, based on the received signal corresponding to a touch input of rotating along inner edges of the circular touch pad.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
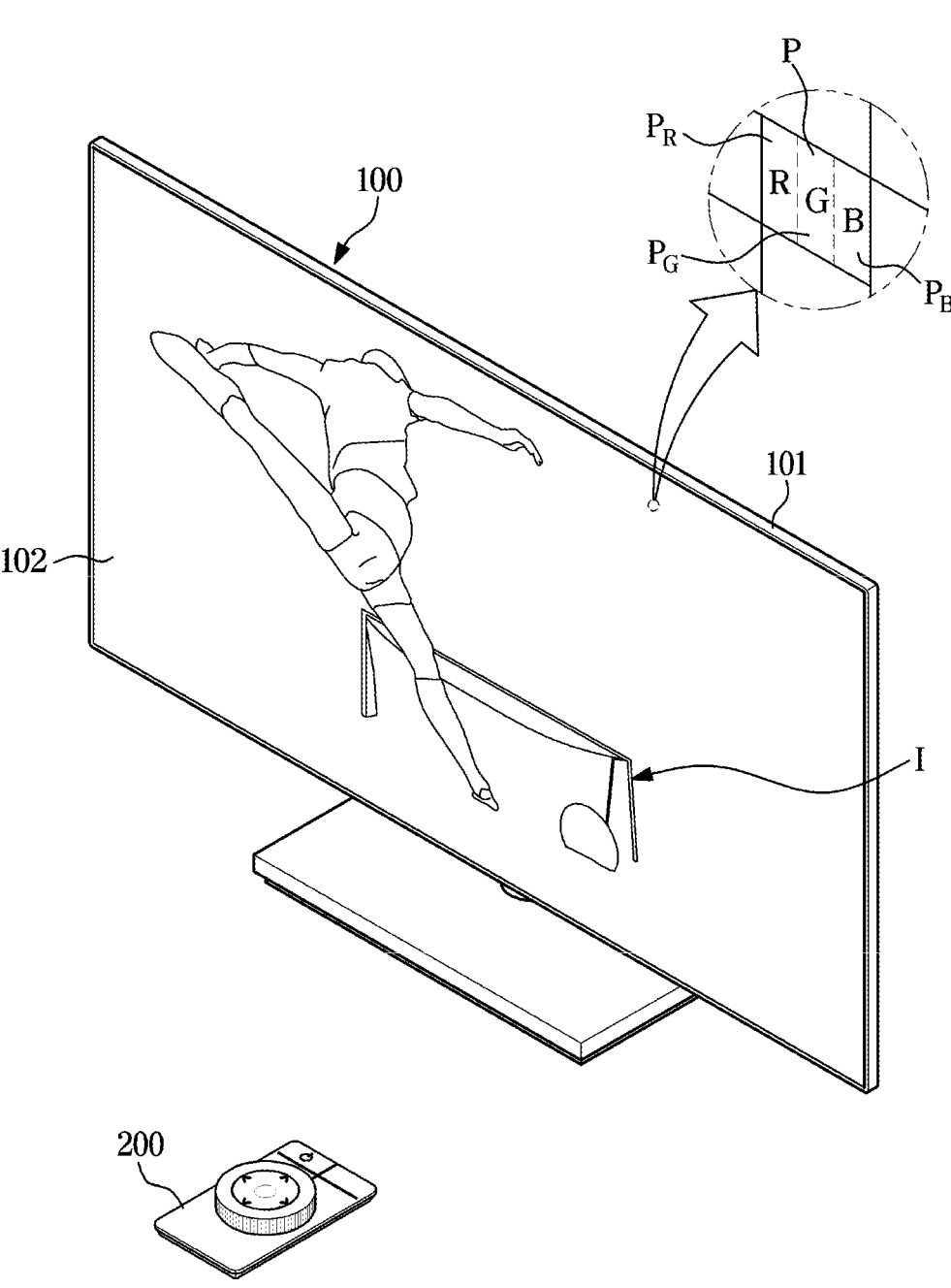
FIG. 1 illustrates a display apparatus including an external input device, according to an embodiment.

Like numerals refer to like elements throughout the specification. Not all elements of embodiments of the disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, when it is said that a member is located "on" another member, it implies not only that the member is located adjacent to the other member but also that a third member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the disclosure will now be described with reference to accompanying drawings.

FIG. 1 illustrates a display apparatus including an external input device, according to an embodiment.

As shown in FIG. 1, a display apparatus 100 is an apparatus capable of processing video data received from outside and/or video data stored inside and visually presenting the processed video (a series of a plurality of image frames). For example, the display apparatus 100 may be implemented in various forms, such as a television (TV), a monitor, a portable multimedia device, a portable communication device, a portable operation device, or any device capable of visually presenting images, the name and form of which is not limited thereto.

The display apparatus 100 may be a large format display (LFD) installed outdoors such as on a rooftop of a building or at a bus stop. The display apparatus 100 is not, however, exclusively installed outdoors, but may be installed at any place, even indoors with a lot of foot traffic, e.g., at subway stations, shopping malls, theaters, offices, stores, etc.

The display apparatus 100 may receive video data and audio data from various content sources. For example, the display apparatus 100 may receive video/audio data (TV broadcast content) through a broadcast receive antenna or a cable, receive video/audio data from a content player, or receive video/audio data from a content providing server of a content provider.

The display apparatus 100 may display an image corresponding to the video data, and output sound corresponding to the audio data. For example, the display apparatus 100 may reconstruct a plurality of image frames included in the video data and display the plurality of image frames successively. Furthermore, the display apparatus 100 may reconstruct an audio signal included in the audio data and successively output sounds based on the audio signal.

As shown in FIG. the display apparatus 100 may include a main body 101 for accommodating a plurality of components for displaying images, and a screen 102 arranged on one side of the main body 101 for displaying image I.

The main body 101 may form the exterior of the display apparatus 100, and the components for the display apparatus 100 to display the image I may be included in the main body 101.

The screen 102 may be formed on the front of the main body 101 for displaying visual information, i.e., the image I.

The screen 102 may be implemented with a display panel, and the display panel may emit light at first hand (self-luminous display panel) or pass or block light emitted by e.g., a backlight unit (non-self-luminous display panel). For example, the display panel may include a liquid crystal display (LCD) panel, a light emitting diode (LED) panel, an organic light emitting diode (OLED) panel, or a quantum dot (QD) display panel.

The screen 102 includes a plurality of pixels P, and the image I to be displayed on the screen 102 may be formed by a combination of rays emitted from the plurality of pixels P. The plurality of pixels P may emit rays in various colors and brightness. For example, the rays emitted by the plurality of pixels P may be combined like a mosaic and formed into one image I on the screen 102.

To display an image in various brightness and various colors, each of the plurality of pixels P may include subpixels $P_{sub1}$, $P_{sub2}$, and $P_{sub3}$. For example, the subpixels may include a red subpixel (PR) to emit red light, a green subpixel (PG) to emit green light, and blue subpixel (PB) to emit blue light (RGB pixels). In another example, the subpixels may include a red subpixel, a green subpixel, a blue subpixel, and a white subpixel to emit white light. (RGBW pixels). In another example, the subpixels may include a red subpixel, a green subpixel, a blue subpixel, and a yellow subpixel to emit yellow light. (RGBY pixels). The subpixel structure is not limited to what are described above, and may include various subpixel compositions known to the public at present or to go public in the future.

The display apparatus 100 may include an input device through which to obtain a user input from the user. For example, there may be a power button to turn on the display apparatus 100 or a volume button to control volume of sound output from the display apparatus 100 arranged on the main body 101.

The user usually watches the display apparatus 100 at a distance from the display apparatus 100, and accordingly, the display apparatus 100 may include an external input device 200 for convenience of the user.

The external input device 200 may include not only the power button and the volume button but also setting modules for setting a layout of a plurality of content images and inputting a setting associated with each of the plurality of content images. For example, the external input device 200 may include a plurality of input keys and at least one control knob (or a dial).

The external input device 200 may obtain a user input from the user, and transmit a signal corresponding to the user input to the main body 101 of the display apparatus 100 through infrared, radio waves, etc.

Configurations and operations of the display apparatus 100 and the external input device 200 will now be described in detail.

Figure 2:
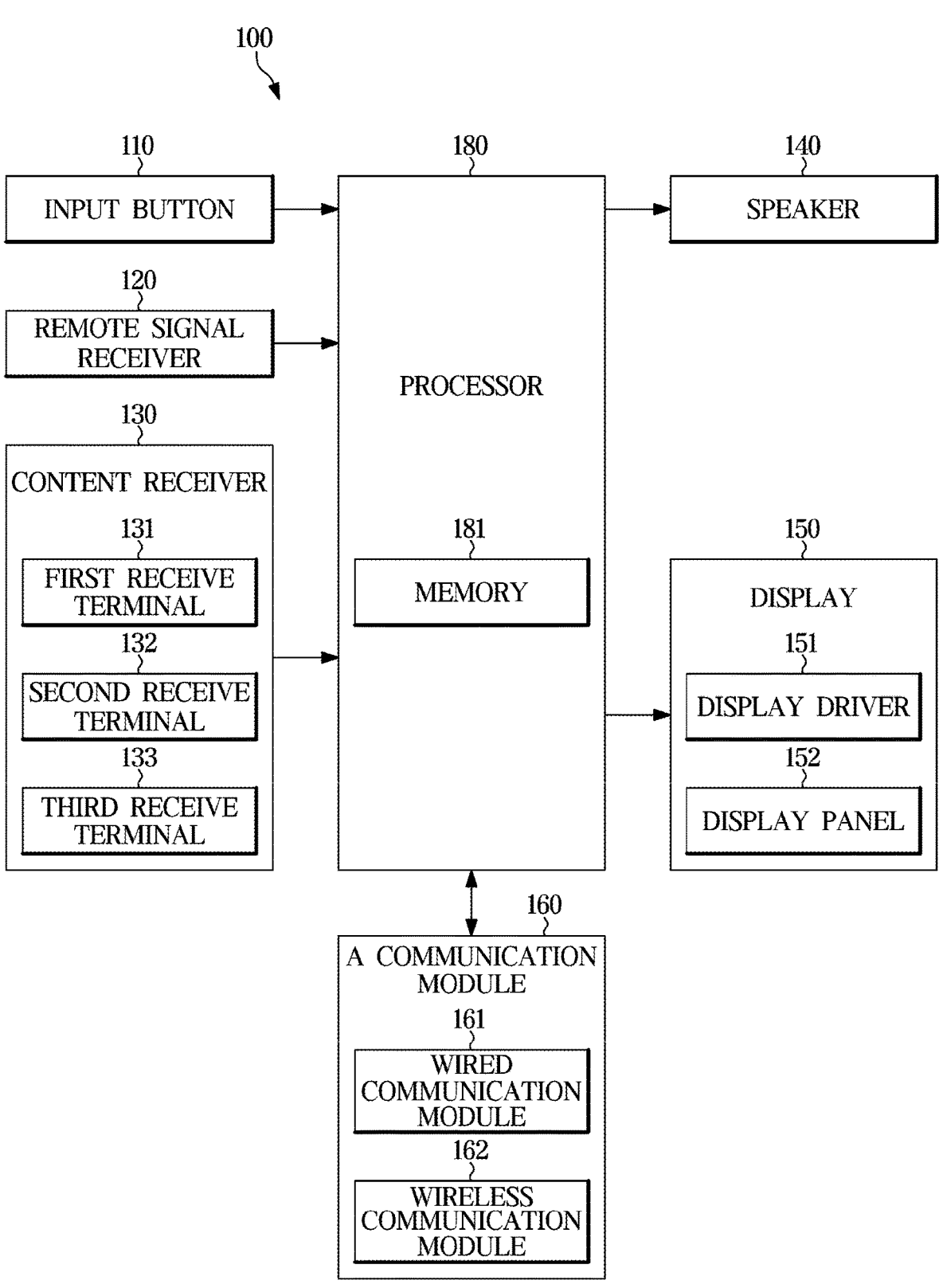
FIG. 2 illustrates a configuration of a display apparatus, according to an embodiment.

FIG. 2 shows a configuration of a display apparatus, according to an embodiment.

Referring to FIG. 2, the display apparatus 100 may include an input button 110, a remote signal receiver 120, a content interface 130, a speaker 140, a display 150, a communication module 160 and/or a processor 180.

The input button 110 may receive a user input. The input button 110 may include a plurality of input buttons, and the different input buttons may obtain different user inputs. For example, the input button 110 may include a power button for turning on or off the display apparatus 100, a volume button for controlling audio volume, a source button for selecting a content source, etc.

The input button 110 may receive each user input and output an electric signal (voltage or current) corresponding to the user input to the processor 180. The processor 180 may identify a user input based on an output signal of the input button 110.

The input button 110 may include at least one of a push switch, a touch switch, a slide switch, and a toggle switch.

The remote signal receiver 120 may receive an infrared signal or a radio signal from the external input device 200. For example, the remote signal receiver 120 may include a photo diode for receiving the infrared signal or a receive antenna for receiving the radio signal.

The external input device 200 may be provided separately from the main body 101 of the display apparatus 100, as described above. The external input device 200 may obtain a user input and output a remote control signal (e.g., an infrared signal or a radio signal) corresponding to the user input obtained.

The remote signal receiver 120 may obtain the remote control signal by decoding the infrared signal or the radio signal received from the external input device 200, and provide an electric signal corresponding to the remote control signal (e.g., a voltage signal or a current signal) to the processor 180.

The content interface 130 may receive video data and/or audio data from content sources.

The content interface 130 may include a first receive terminal 131, a second receive terminal 132, and a third receive terminal 133. The first receive terminal 131 may include, for example, a component (YPbPr/RGB) terminal, a composite video blanking and sync (CVBS) terminal, an audio terminal, etc., to receive video/audio data from content sources.

The second receive terminal 132 may include, for example, a high definition multimedia interface (HDMI) terminal to receive video/audio data from a content source.

The third receive terminal 133 may include, for example, a universal serial bus (USB) terminal.

The content interface 130 is not limited to including the three receive terminals as shown in FIG. 2, but may also include 2 or less or 4 or more receive terminals.

The speaker 140 may audibly output an audio signal. The speaker 140 may convert the audio signal output from the processor 180 to sound. For example, the speaker 140 may include a thin film that vibrates according to the audio signal, and the vibration of the thin film may produce the sound.

The speaker 140 may include a left surround speaker arranged on the left of the main body 101 and a right surround speaker arranged on the right of the main body 101 to output stereo sound.

The display 150 includes a display panel 152 for visually presenting images, and a display driver 151 for driving the display panel 152.

The display apparatus 100 may reconstruct a plurality of image frames included in video data and display the plurality of image frames successively.

The display driver 151 may convert each of the reconstructed plurality of image frames to be displayed on the display panel 152 to an analog image signal (hereinafter, referred to as a driving signal) and send the driving signal to the display panel 152.

The display driver 151 may send the driving signal to each of the plurality of pixels included in the display panel 152. Each of the plurality of pixels of the display panel 152 may emit a ray according to the driving signal, and rays emitted from the plurality of pixels may be combined into one image.

The display panel 152 may emit rays according to the driving signal received from the display driver 151 and display an image.

The display panel 152 may include pixels, each pixel being a unit for displaying the image. Each pixel may receive the driving signal to display the image from the display driver 151, and output an optical signal corresponding to the received driving signal. As such, optical signals output from the plurality of pixels P may be combined into one image to be displayed on the display panel 152.

The display apparatus 100 may include the display panel 152 having various forms to display images.

For example, the display apparatus 100 may include a non-self-luminous display panel that passes or blocks rays emitted from a light source (backlight unit) to display an image. An LCD panel or the like is a representative non-self-luminous display panel.

The display panel 152 may include a liquid crystal panel and a backlight unit. The backlight unit may include a plurality of light sources capable of emitting white light including red light, green light and blue light. The liquid crystal panel may selectively pass the red light, green light and blue light emitted from the backlight unit. For example, red subpixels of the liquid crystal panel may selectively pass the red light but block the green light and the blue light. Green subpixels of the liquid crystal panel may selectively pass the green light but block the blue light and the red light. Blue subpixels of the liquid crystal panel may selectively pass the blue light but block the red light and the green light.

Furthermore, the display driver 151 may include a liquid crystal panel driver for driving the liquid crystal panel and a dimming driver for driving the backlight unit. The liquid crystal panel driver may output a driving signal for forming an image to the liquid crystal panel. Intensity (or an amount of light) of the light passing through each of the plurality of subpixels of the liquid crystal panel may be controlled by the driving signal of the liquid crystal panel driver, and an image may be formed by the light that has passed each of the plurality of subpixels. The dimming driver may output a dimming signal for locally controlling brightness of the backlight unit to the backlight unit. The intensity of light (or an amount of light) emitted from the backlight unit may be locally controlled by the dimming signal, thereby enhancing contrast of the image displayed on the liquid crystal panel.

In this way, the dimming driver may drive the backlight unit to emit light, and the liquid crystal panel driver may drive the liquid crystal panel to pass or block the light from the backlight unit.

In another example, the display apparatus 100 may include a self-luminous display panel to display an image using an element that emits light by itself. An OLED panel or a QD display panel is a representative self-luminous display panel.

The display panel 152 includes an LED panel. The LED panel may include a red LED that is able to emit red light, a green LED that is able to emit green light, and a blue LED that is able to emit blue light, Each of the LEDs may serve as a subpixel. The red LED, the green LED and the blue LED may serve as the red subpixel, the green subpixel, and the blue subpixel, respectively. The QD display panel may include red, green and blue quantum dots, and each of the quantum dots may serve as a subpixel.

The display driver 151 includes an LED driver. The LED driver may output a driving signal for forming an image to the LED panel. Driving currents may be applied to the red, green and blue LEDs and the intensity (or an amount) of light emitted from each of the red, green and blue LEDs may be controlled according to the driving signal. An image may be formed by rays emitted from the LEDs.

The LED driver may operate the display panel 152. For example, the LED driver may drive the display panel 152 to display an image on the display panel 152.

The communication module 160 may receive video/audio data from a content source connected to a network.

The communication module 160 may include a wired communication module 161 for receiving video/audio data from a content source through a cable and a wireless communication module 162 for receiving video/audio data from a content source wirelessly.

The wired communication module 161 may use various communication standards to receive a data stream from a content source. For example, the wired communication module 161 may use Ethernet, the IEEE 802.3 technology standard to receive video/audio data from the content source.

The wired communication module 161 may include a communication circuit (e.g., a wired communication interface controller) including a wired communication terminal for wiredly accessing a network, a processor for modulating and/or demodulating data for wired communication, and/or a memory.

The wireless communication module 162 may exchange wireless signals with an external input device 200. Furthermore, the wireless communication module 162 may receive a data stream from a content source through the external input device 200.

For example, the wireless communication module 162 may use wireless fidelity (Wi-Fi, an IEEE 802.11 technology standard) radio communication to access a wireless repeater and receive video/audio data from a content source through the repeater.

The Wi-Fi radio communication may provide peer-to-peer communication between nodes without going through the wireless repeater. Such a Wi-Fi radio communication based peer-to-peer communication is referred to as "Wi-Fi P2P" or "Wi-Fi Direct". The wireless communication module 162 may use the Wi-Fi P2P communication standard to exchange data with the external input device 200.

Furthermore, the wireless communication module 162 may use Bluetooth, which is the IEEE 802.15.1 technology standard, or ZigBee, which is the IEEE 802.15.4 technology standard to exchange data with the external input device 200. Alternatively, the wireless communication module 162 may use near field communication (NFC) to exchange data with the external input device 200.

The wireless communication module 162 may include a communication circuit (e.g., a wireless communication interface controller) including an antenna for transmitting or receiving wireless signals, a processor for decoding and/or encoding data for wireless communication, and/or a memory.

The processor 180 may process video/audio data and control the display apparatus 100. The processor 180 may include a memory 181 for memorizing/storing data and a program to process the video/audio data. The processor 180 may include not only hardware but also software such as an operating system, a video player and an audio player.

The memory 181 may store a program and data for processing video/audio data, and temporarily store temporary data generated in the process of handling the video/audio data.

The memory 181 may include a non-volatile memory, such as a Read Only Memory (ROM), a flash memory, and/or the like, which may store data for a long period, and a volatile memory, such as a static random access memory (SRAM), a dynamic RAM (DRAM), or the like, which may temporarily store data.

The memory 181 may include one memory chip having a plurality of memory cores or a plurality of memory chips.

The processor 180 may restore a plurality of image frames and audio signals from the video/audio data received through the content interface 130 and/or the communication module 160 by decoding the received video/audio data. The plurality of image frames may be displayed on the display 150. Sound from the audio signal may be output through the speaker 140.

The processor 180 may receive a plurality of content data items from a plurality of content sources through the content interface 130 and/or the communication module 160. The processor 180 may generate one image frame including a plurality of content images associated with the plurality of content data items, respectively. The image frame may be made up of one content image received from one content source or may include a plurality of content images received from a plurality of content sources, respectively.

The processor 180 may receive a remote control signal corresponding to a user input from the external input device 200 through the remote signal receiver 120. The processor 180 may change a size of the content image, a position of the content image, or a layout of content images based on a user input received from the external input device 200.

The processor 180 may include one processor chip including a plurality of cores, or a plurality of processor chips. For example, the processor 180 may include an image processor for processing video/audio data, and a micro controller for processing a touch input of the user and controlling operations of the display apparatus 100. Furthermore, the processor 180 may be provided separately from the memory 181 or may be integrated with the memory 181.

As described above, the display apparatus 100 may display a plurality of content images received from a plurality of content sources on one display 150. Furthermore, the display apparatus 100 may obtain user inputs through the external input device 200, and change sizes, positions and a layout of the plurality of content images based on the user inputs.

Figure 3:
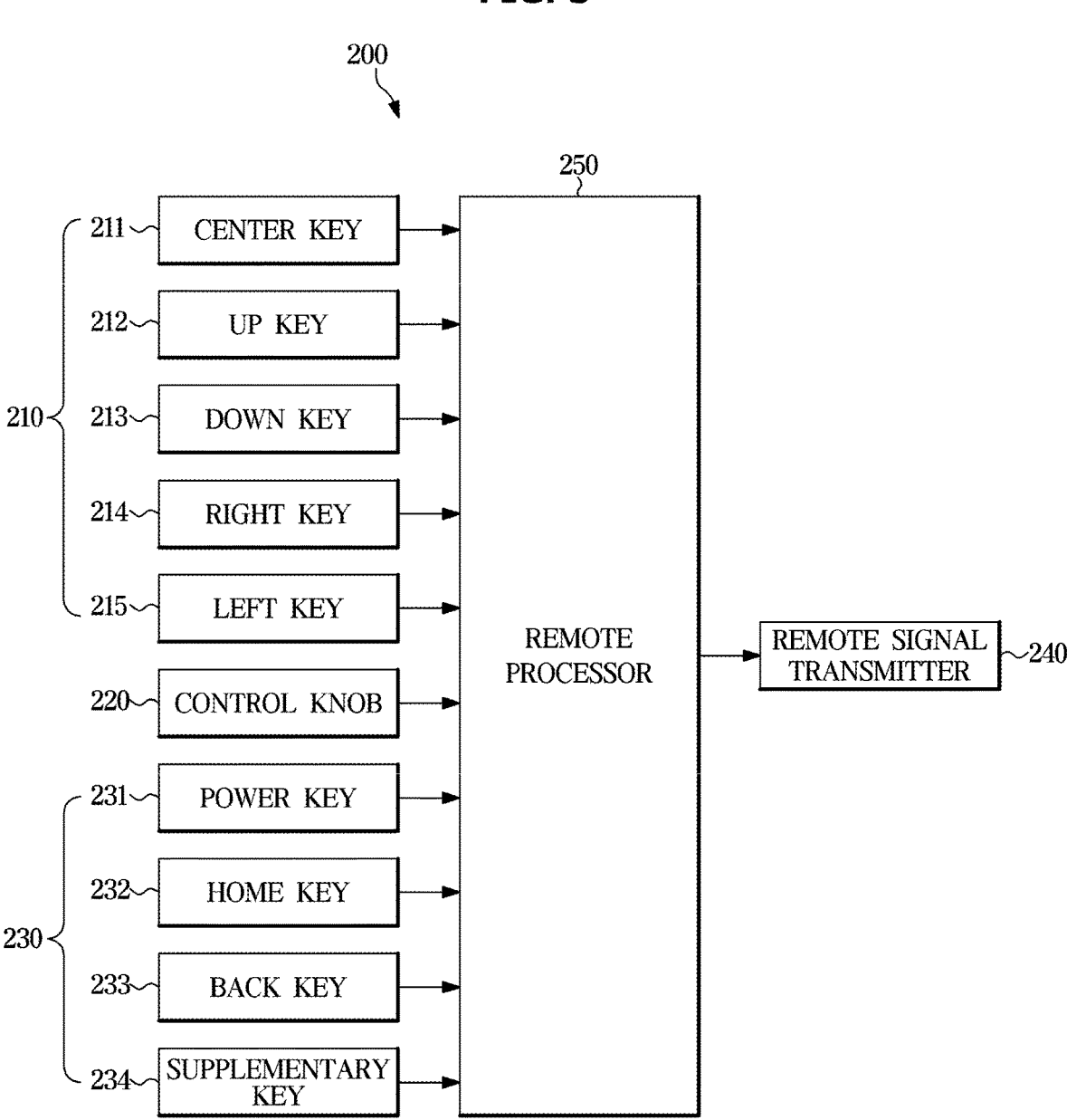
FIG. 3 illustrates a configuration of an external input device included in a display apparatus, according to an embodiment.
Figure 4:
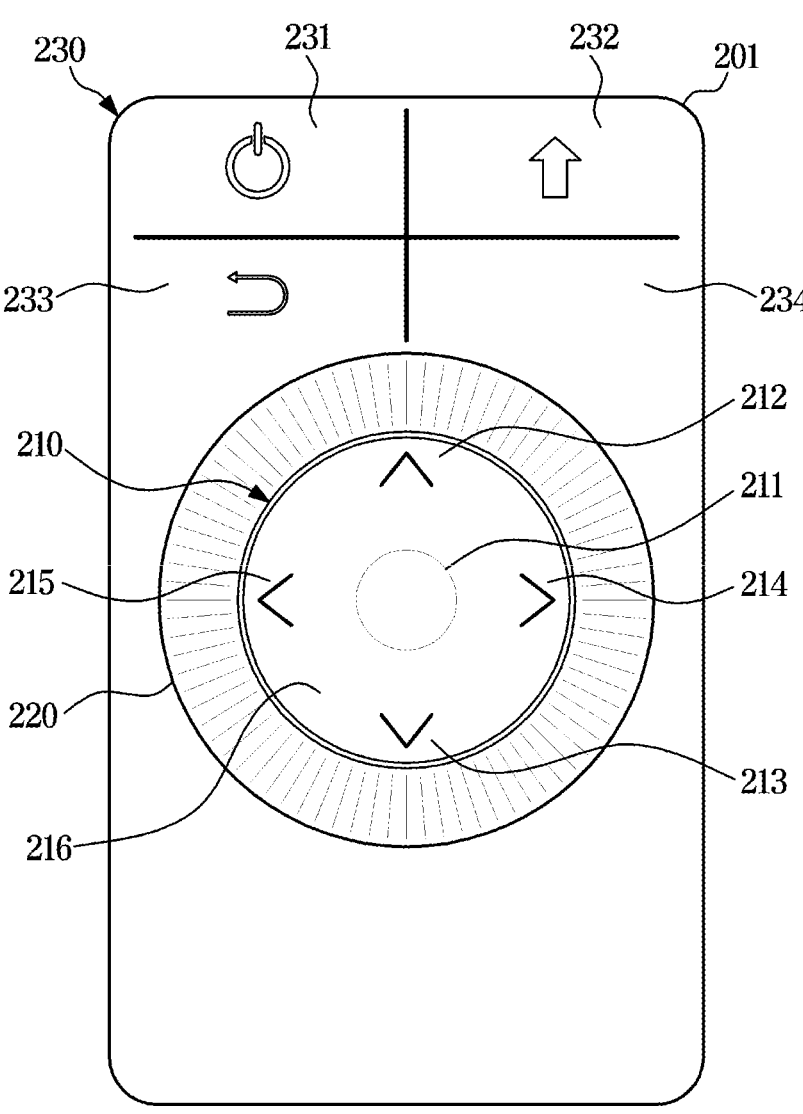
FIG. 4 illustrates a button layout on an external input device included in a display apparatus, according to an embodiment.

FIG. 3 illustrates a configuration of an external input device included in a display apparatus, according to an embodiment. FIG. 4 illustrates a button layout on an external input device included in a display apparatus, according to an embodiment.

As shown in FIGS. 3 and 4, the external input device 200 may include a plurality of directional keys 210, a control knob 220, a plurality of function keys 230, a remote signal transmitter 240, and a remote processor 250. The external input device 200 may further include a main body 201 that accommodates the control knob 220, the plurality of function keys 230, the remote signal transmitter 240, and the remote processor 250.

The plurality of directional keys 210 may include a center key 211, an up key 212, a down key 213, a right key 214 and a left key 215.

The center key 211, the up key 212, the down key 213, the right key 214 and the left key 215 may share a key cap 216. The center key 211, the up key 212, the down key 213, the right key 214 and the left key 215 may include different switches operated by the one key cap 216. Depending on a position on the key cap 216 pressed by the user, at least one of the center key 211, the up key 212, the down key 213, the right key 214 and the left key 215 may be operated.

Each of the center key 211, the up key 212, the down key 213, the right key 214 and the left key 215 is not allocated a unique user input, but may be allocated a dynamic user input. Specifically, each of the center key 211, the up key 212, the down key 213, the right key 214 and the left key 215 may be allocated a user input depending on an image displayed on the display 150 of the display apparatus 100.

While the display apparatus 100 displays a content, a user input to enter an edit mode for editing the layout of content images may be allocated to the center key 211. In the edit mode, a user input for selecting or designating a content image may be allocated to the center key 211.

In the edit mode, the up key 212, the down key 213, the right key 214 and the left key 215 may be allocated a user input for sequentially changing an activated content image among the plurality of content images.

Each of the center key 211, the up key 212, the down key 213, the right key 214 and the left key 215 may provide an electric signal indicating that the key is pressed by the user to the remote processor 250.

The control knob 220 has the shape of a ring that encloses the key cap 216 that forms the center key 211, the up key 212, the down key 213, the right key 214 and the left key 215, and may be mechanically rotated on the main body 201.

A user input may be obtained by rotation of the control knob 220. For example, the control knob 220 may be rotated clockwise or counterclockwise, and may obtain a user input indicating an increase or a decrease in physical quantity (e.g., display brightness, display contrast, or display definition) to be controlled depending on the rotational direction. As the control knob 220 is rotated clockwise, a user input indicating an increase in physical quantity to be controlled may be obtained. Furthermore, when the control knob 220 is rotated counterclockwise, a user input indicating a decrease in physical quantity to be controlled may be obtained.

The control knob 220 is not allocated a unique user input, but may be allocated a dynamic user input. Specifically, the control knob 220 may be allocated a user input depending on an image displayed on the display 150 of the display apparatus 100.

For example, a user input for changing the size of an activated content image may be allocated to the control knob 220 in the edit mode.

The control knob 220 may provide an electric signal corresponding to a rotational direction and a rotational displacement of the control knob 220 to the remote processor 250.

As such, the plurality of directional keys 210 may be formed by one key cap 216, and the control knob 220 may be formed in the shape of a ring that encloses one key cap. Accordingly, the plurality of directional keys 210 and the control knob 220 may be manufactured to have a sense of unity.

Furthermore, the plurality of directional keys 210 and the control knob 220 may be formed to protrude from the surface of the main body 101 or formed on the same plane as the surface of the main body 101. Alternatively, the plurality of directional keys 210 and the control knob 220 may have a concave shape sunken from the surface of the main body 101.

The plurality of directional keys 230 may include a power key 231, a home key 232, a back key 233, and a supplementary key 234.

The power key 231, the home key 232, the back key 233 and the supplementary key 234 may be provided separately from the plurality of directional keys 210 and the control knob 220.

Each of the power key 231, the home key 232, the back key 233, and the supplementary key 234 may be allocated a unique user input. The power key 231 may be allocated a user input to turn on or turn off the display apparatus 100. The home key 232 may be allocated a user input to return the display apparatus 100 into the turned-on state and display a home image on the display 150. The back key 233 may be allocated a user input to return the display apparatus 100 into the previous state and display a previous image on the display 150.

Each of the power key 231, the home key 232, the back key 233 and the supplementary key 234 may provide an electric signal corresponding to the unique user input allocated to the key to the remote processor 250.

The remote signal transmitter 240 may transmit an infrared signal or a radio signal (hereinafter, referred to as a remote control signal) based on the remote control signal from the remote processor 250. For example, the remote signal transmitter 240 may include an LED for transmitting an infrared signal or a transmit antenna for transmitting a radio signal.

The remote signal transmitter 240 may modulate the infrared signal or the radio signal based on a remote control signal from the remote processor 250. The remote signal transmitter 240 may transmit the modulated infrared signal or radio signal that indicates the remote control signal.

The remote processor 250 may receive electric signals from the plurality of directional keys 210, the control knob 220 and the plurality of function keys 230 and process the received electric signals. Furthermore, the remote processor 250 may provide a remote control signal to the remote signal transmitter 240 based on the processing of the received electric signal.

The remote processor 250 may include one processor chip including a plurality of cores, or a plurality of processor chips. The remote processor 250 may be provided to be separated from or integrated with the memory. The remote processor 250 may include, for example, a micro controller for controlling operations of the external input device 200.

As described above, the external input device 200 may include the plurality of directional keys 210 and the control knob 220 manufactured to have a sense of unity, and the plurality of directional keys 210 and the control knob 220 may be allocated dynamic user inputs.

Figure 5:
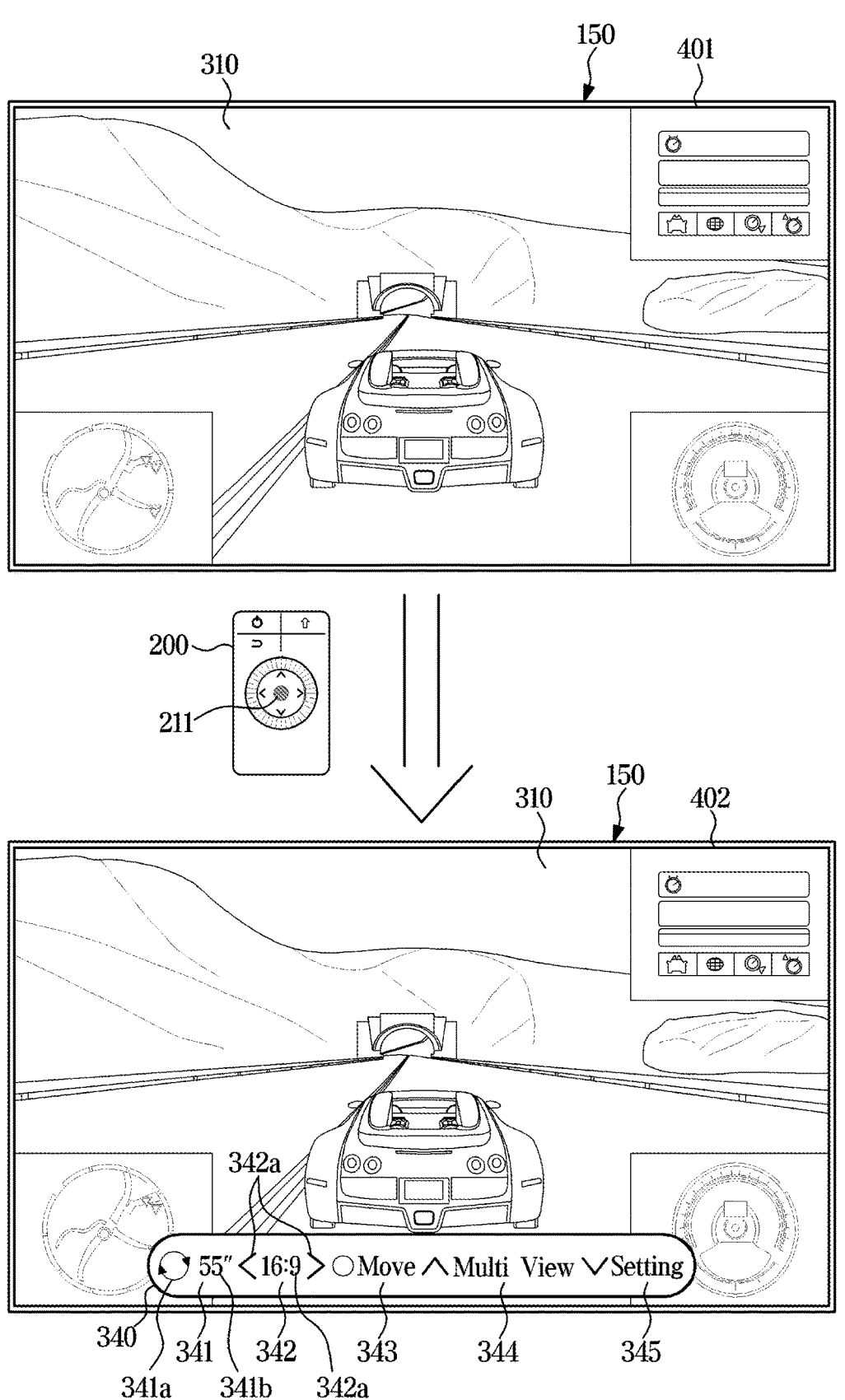
FIG. 5 illustrates an example in which a display apparatus is switched into an edit mode, according to an embodiment.

FIG. 5 illustrates an example in which a display apparatus is switched into an edit mode, according to an embodiment.

The display apparatus 100 may receive a remote control signal corresponding to a user input from the external input device 200, and control the display 150 in response to the received remote control signal.

As shown in FIG. 5, the display apparatus 100 may receive content from a content source. The processor 180 of the display apparatus 100 may process video data contained in the content, and control the display 150 to display a first content image 310 based on the processing of the video data. In other words, the processor 180 may provide an image frame 401 including only the first content image 310 to the display 150.

In this case, the processor 180 may operate in a display mode.

While the display apparatus 100 displays a series of images, the external input device 200 may obtain a user input to change a setting associated with the display 150 from the user.

For example, as shown in FIG. 5, the user may press the center key 211 on the external input device 200. The external input device 200 may transmit a remote control signal corresponding to the operation of the center key 211.

The processor 180 may receive the remote control signal through the remote signal receiver 120, and may be switched from the display mode to an edit mode in response to a remote control signal from the external input device 200.

In the edit mode, the processor 180 may control the display 150 to display a key guide 340 on the first content image 310, as shown in FIG. 5. In other words, the processor 180 may provide an image frame 402 with the key guide 340 overlapping on the first content image 310 to the display 150.

The key guide 340 may include control commands mapped to the plurality of directional keys 210 and the control knob 220 of the external input device 200. For example, as shown in FIG. 5, the key guide 340 may include a first guide image 341 indicating a user input mapped to a rotation of the control knob 220, a second guide image 342 indicating a user input mapped to the right key 214 and the left key 215, a third guide image 343 indicating a user input mapped to the center key 211, a fourth guide image 344 indicating a user input mapped to the down key 213, and a fifth guide image 345 indicating a user input mapped to the up key 212.

For example, a rotation of the control knob 220 may be mapped to a user input for resizing or controlling the content image. As shown in FIG. 5, the first guide image 341 may include a guide image 341a indicating a rotation of the control knob 220 and a guide image 341b indicating a size of a selected content image.

A user input for changing or adjusting an aspect ratio of the content image may be mapped to the right key 214 and the left key 215. The aspect ratio may indicate a ratio between a horizontal width of the image (or horizontal resolution) and a vertical height of the image (or vertical resolution). As shown in FIG. 5, the second guide image 342 may include a guide image 342a indicating the right key 214 and the left key 215, and a guide image 342b indicating an aspect ratio of the selected content image.

As such, a user input for changing the content image immediately in response to an input may be mapped to the control knob 220 and the right key 214/left key 215. Accordingly, the user may use the control knob 220 and the right key 214/left key 215 to change or adjust the size and/or aspect ratio of the content image while keeping an eye on the content image. Furthermore, the user may immediately check the size and/or aspect ratio of the content image through the key guide 340.

A user input for moving the selected content image may be mapped to the center key 211. A user input for displaying a plurality of content images on the display 150 may be mapped to the up key 212. Furthermore, a user input for changing or controlling an image parameter of the content image may be mapped to the down key 213.

In the edit mode, the processor 180 may map control commands to remote control signals from the plurality of directional keys 210 and remote control signals from the control knob 220 in the same way as indicated in the key guide 340.

The control commands mapped to the respective remote control signals will be described below in more detail.

Figure 6:
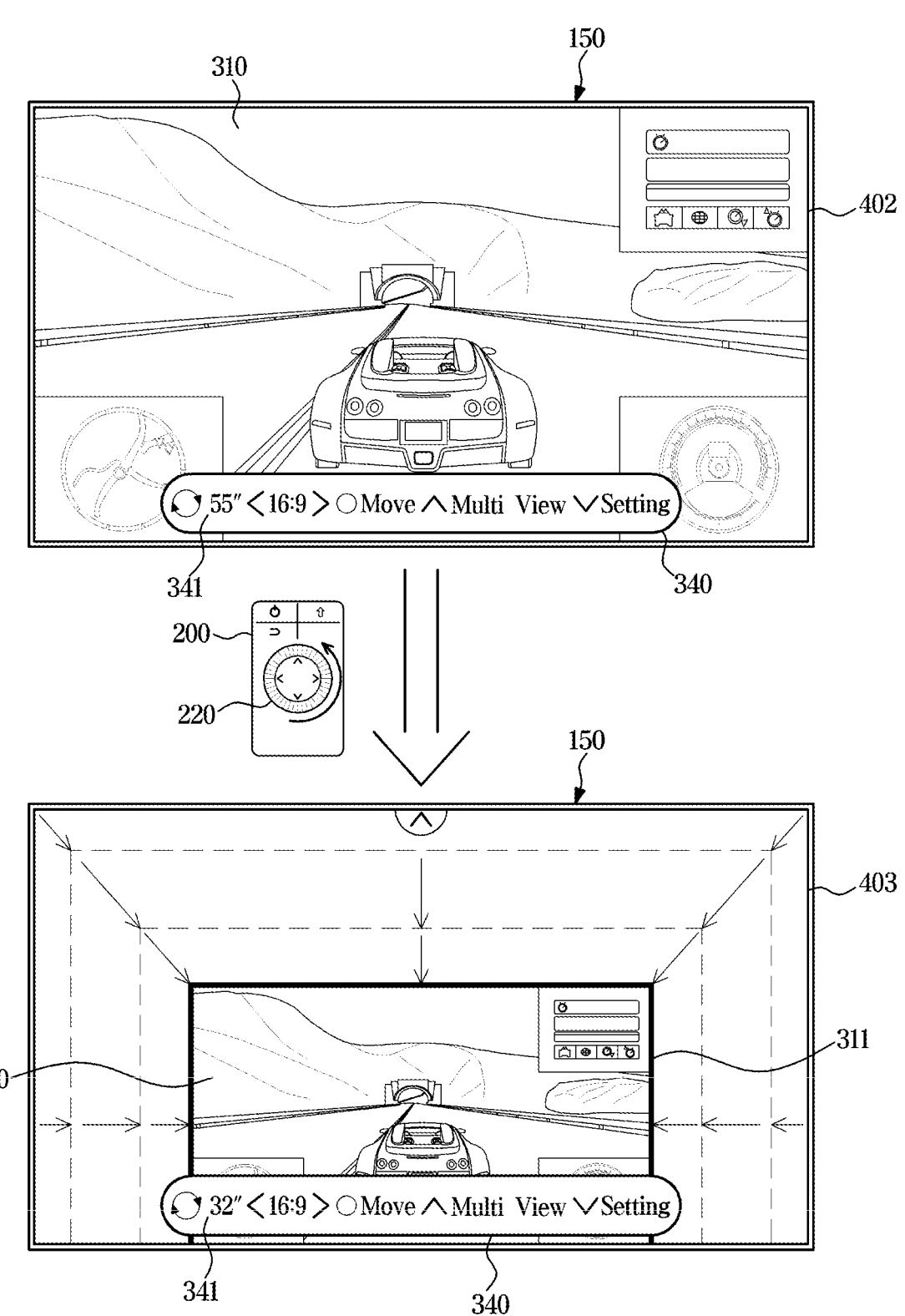
FIG. 6 illustrates an example in which a display apparatus scales down a content image, according to an embodiment.
Figure 7:
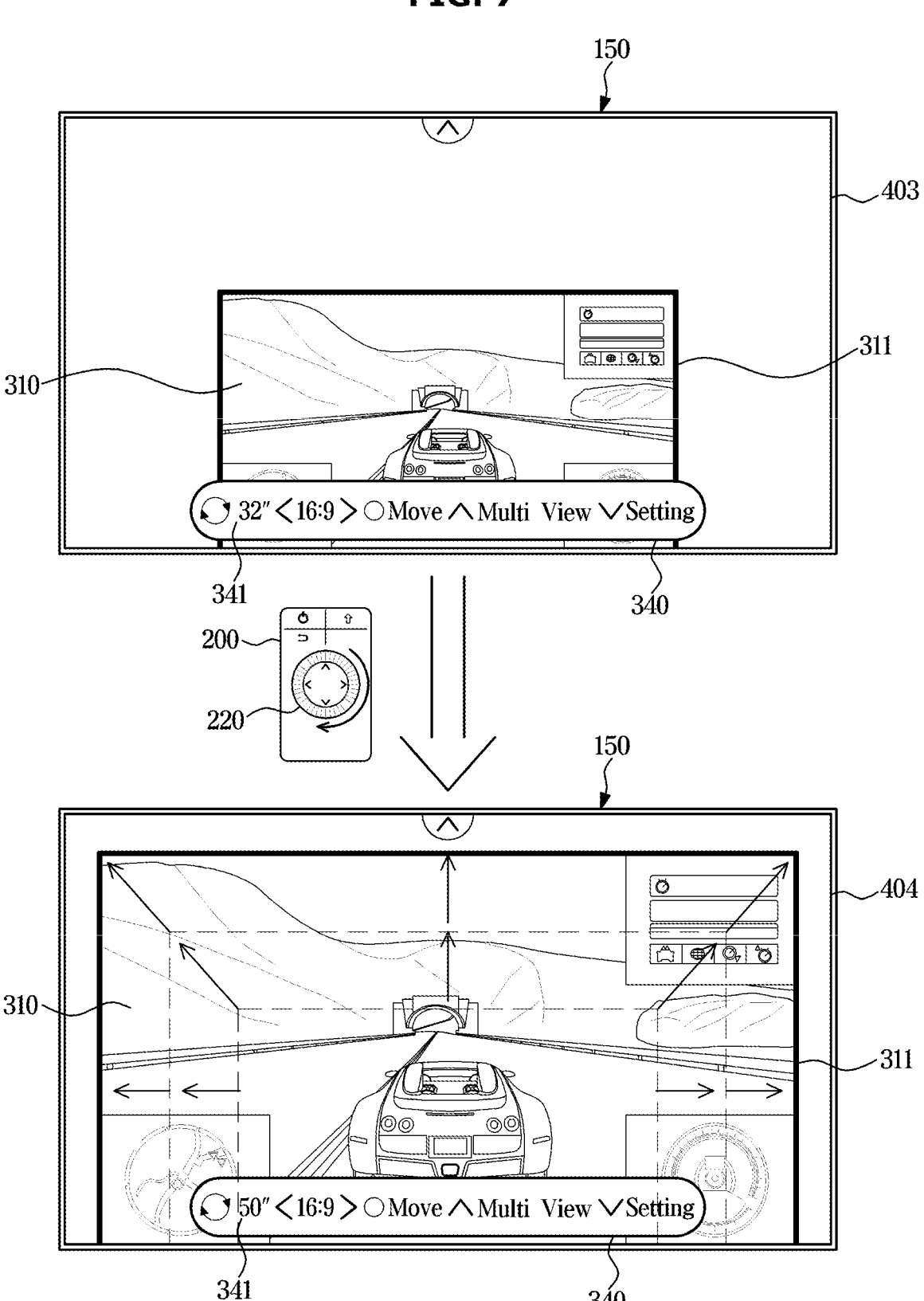
FIG. 7 illustrates an example in which a display apparatus scales up a content image, according to an embodiment.

FIG. 6 illustrates an example in which a display apparatus scales down a content image, according to an embodiment. FIG. 7 illustrates an example in which a display apparatus scales up a content image, according to an embodiment.

The processor 180 may control the display 150 to display the key guide 340 on the first content image 310.

The external input device 200 may obtain a user input from the user to scale down or scale up the first content image 310 displayed on the display 150.

For example, as shown in FIG. 6, the external input device 200 may obtain a user input that rotates the control knob 220 counterclockwise.

The processor 180 may control the display 150 to scale down the first content image 310 in response to the user input of rotating the control knob 220 of the external input device 200 counterclockwise. In other words, the processor 180 may provide an image frame 403 with the first content image 310 scaled down to the display 150.

The processor 180 may indicate the size of the first content image 310 being changed on the key guide 340 while scaling down the first content image 310. For example, the processor 180 may control the display 150 to display a size (e.g., 55 inches as shown in FIG. 6) of the first content image 310 in the first guide image 341 of the key guide 340. The processor 180 may control the display 150 to display the changed size (32 inches as shown in FIG. 6) of the first content image 310 in the first guide image 341, in response to the user input of rotating the control knob 220 counterclockwise.

In this case, the first content image 310 may be designated as an activated content image selected by the user. To indicate that the first content image 310 is the activated content image, border lines 311 may be displayed around the first content image 310. The user may easily identify the content image selected by the user through the border lines 311.

The processor 180 may control the display 150 to discontinuously or gradually scale down the first content image 310. The processor 180 may control the display 150 to gradually scale down the first content image 310 based on the monitor size widely used commercially. For example, the processor 180 may control the display 150 to gradually scale down the first content image 310 in the order of 55, 47, 42, 32, 27 and 24 inches.

Alternatively, the processor 180 may control the display 150 to continuously or linearly scale down the first content image 310. The processor 180 may control the display 150 to linearly scale down the first content image 310 according to the rotational displacement of the control knob 220.

In another example, as shown in FIG. 7, the external input device 200 may obtain a user input that rotates the control knob 220 of the external input device 200 clockwise.

The processor 180 may control the display 150 to scale up the first content image 310 in response to the user input of rotating the control knob 220 of the external input device 200 clockwise. In other words, the processor 180 may provide an image frame 404 with the first content image 310 scaled up to the display 150.

The processor 180 may indicate a change in size of the first content image 310 on the key guide 340 while scaling up the first content image 310. For example, the processor 180 may control the display 150 to display a size (e.g., 32 inches as shown in FIG. 7) of the first content image 310 in the first guide image 341 of the key guide 340. The processor 180 may control the display 150 to display the changed size (50 inches as shown in FIG. 7) of the first content image 310 in the first guide image 341, in response to the user input of rotating the control knob 220 clockwise.

The processor 180 may control the display 150 to discontinuously or gradually scale up the first content image 310 based on the monitor size widely used commercially. Alternatively, the processor 180 may control the display 150 to discontinuously or linearly scale up the first content image 310 according to the rotational displacement of the control knob 220.

In FIGS. 6 and 7, shown is the content image being scaled down or up in response to clockwise or counterclockwise rotation of the control knob 220. However, it is not limited thereto. For example, the content image may be scaled down or up in response to operation of the up key 212 or operation of the down key 213. Furthermore, the content image may be scaled down or up in response to operation of the right key 214 or operation of the left key 215.

In FIGS. 6 and 7, shown are the content images being scaled down toward a lower center of the image frame and scaled up from the lower center of the image frame. The content image may be arranged on a lower side of the image frame while the content image is being scaled down or up.

However, it is not limited thereto. For example, the content image may be scaled down toward an upper center of the image frame and scaled up from the upper center of the image frame. The content image may be arranged on an upper side of the image frame while the content image is being scaled down or up. Alternatively, the content image may be scaled down toward a left center or a right center of the image frame and scaled up from the left center or the right center of the image frame.

Figure 8:
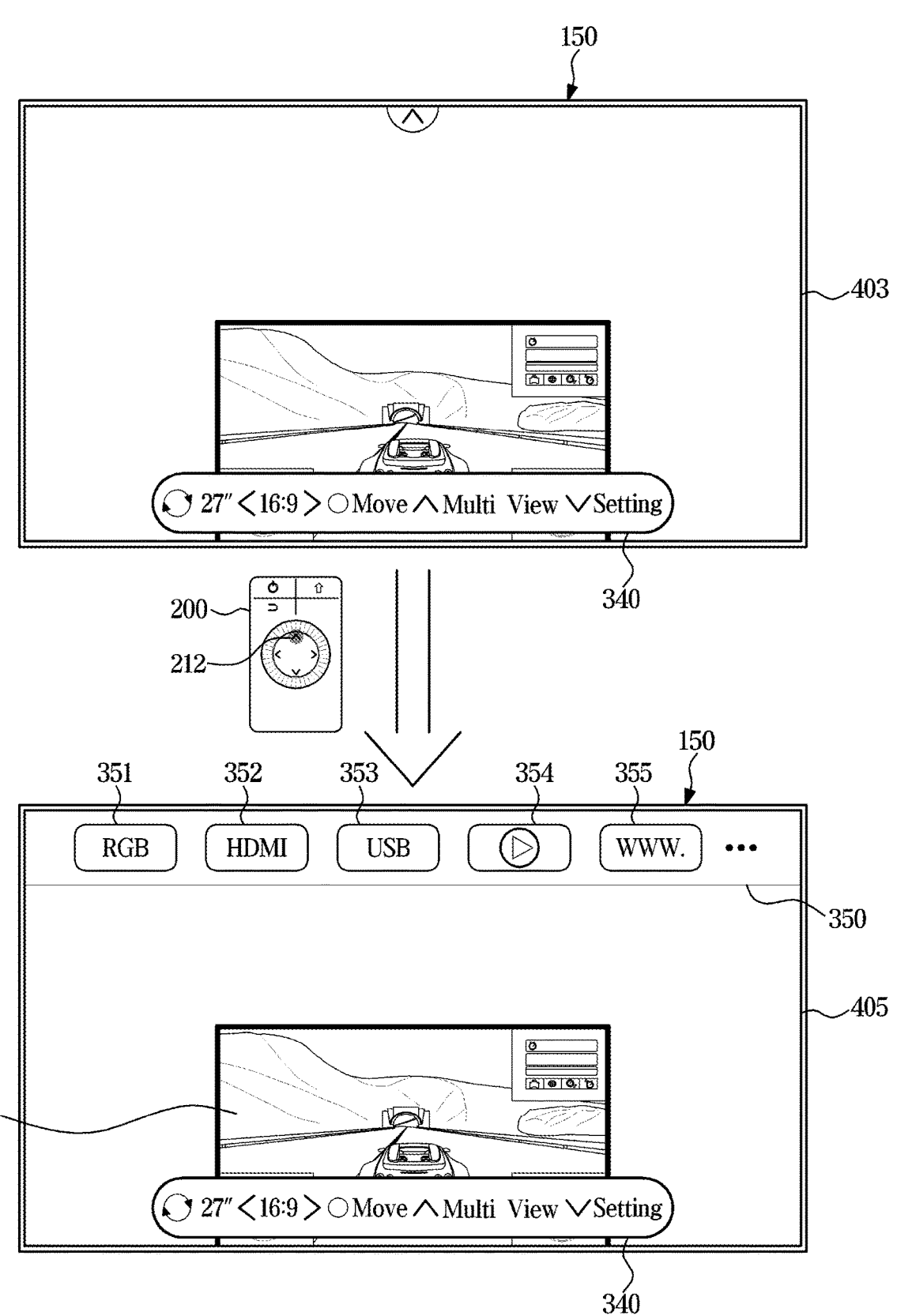
FIG. 8 illustrates an example in which a display apparatus displays a plurality of content images, according to an embodiment.
Figure 9:
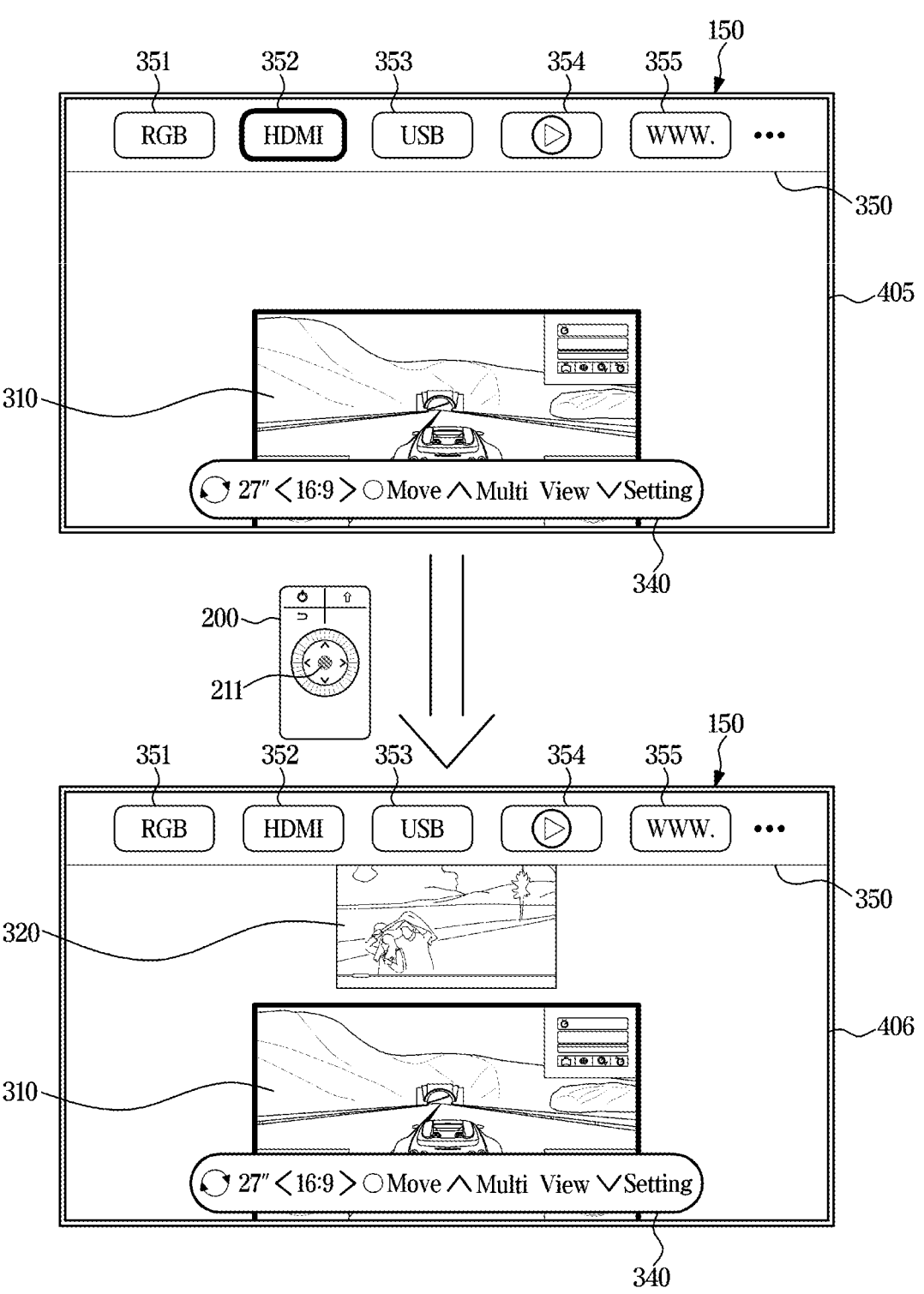
FIG. 9 illustrates an example in which a display apparatus displays a plurality of content images, according to an embodiment.

FIGS. 8 and 9 illustrate an example in which a display apparatus displays a plurality of content images, according to an embodiment.

The processor 180 may control the display 150 to display the first content image 310 scaled down based on the user input through the external input device 200 and display the key guide 340 on the scaled-down first content image 310.

While the key guide 340 is displayed, the external input device 200 may obtain a user input to add or remove a content image displayed on the display 150.

For example, as shown in FIG. 8, the external input device 200 may obtain a user input that operates the up key 212.

The processor 180 may control the display 150 to display a multi-view guide 350 to add a content image to the first content image 310, in response to a user input of operating the up key 212 of the external input device 200. In other words, the processor 180 may provide an image frame 405 including the multi-view guide 350 to the display 150.

The multi-view guide 350 may include images corresponding to a plurality of content sources. For example, the multi-view guide 350 may include a first source image 351 corresponding to the first receive terminal 131, a second source image 352 corresponding to the second receive terminal 132, a third source image 353 corresponding to the third receive terminal 133, a fourth source image 354 corresponding to a video play application that may play the content stored in the memory 182, and a fifth source image 355 corresponding to a browser application that may play content stored in a content server in a network.

While the multi-view guide 350 is displayed, the external input device 200 may obtain a user input to select a content source from the user.

For example, as shown in FIG. 9, the external input device 200 may obtain a user input that operates the center key 211 following an operation of the right key 214 or the left key 215.

The processor 180 may control the display apparatus 100 to display a second content image 320 along with the first content image 310 as shown in FIG. 9, in response to a user input of operating the center key 211 following an operation of the right key 214 or the left key 215 of the external input device 200. In other words, the processor 180 may provide an image frame 406 with the first content image 310 and the second content image 320 arranged in parallel to the display 150.

In this case, the second content image 320 may be a content image included in the content received from a content source added by the user.

Although the second content image 320 is shown as being added to the first content image 310 in FIGS. 8 and 9, it is not limited thereto. For example, two or more content images may be added to the first content image 310.

Although the multi-view guide 350 is shown as being displayed in response to operation of the up key 212 in FIGS. 8 and 9, it is not limited thereto. For example, the multi-view guide 350 may be displayed in response to operation of the down key 213. Furthermore, the user input to display the multi-view guide 350 may be associated with arrangement of the scaled-down content image. When the scaled-down content image is arranged on a lower side of the image frame, the multi-view guide 350 may be displayed on an upper side of the image frame in response to operation of the up key 212, and when the scaled-down content image is arranged on an upper side of the image frame, the multi-view guide 350 may be displayed on a lower side of the image frame in response to operation of the down key 213.

Although the multi-view guide 350 is shown as being displayed in response to operation of the up key 212 while the first content image 310 is scaled down in FIGS. 8 and 9, it is not limited thereto. For example, the multi-view guide 350 may be displayed in response to operation of the up key 212 while the first content image 310 is displayed on the full screen 102.

Figure 10:
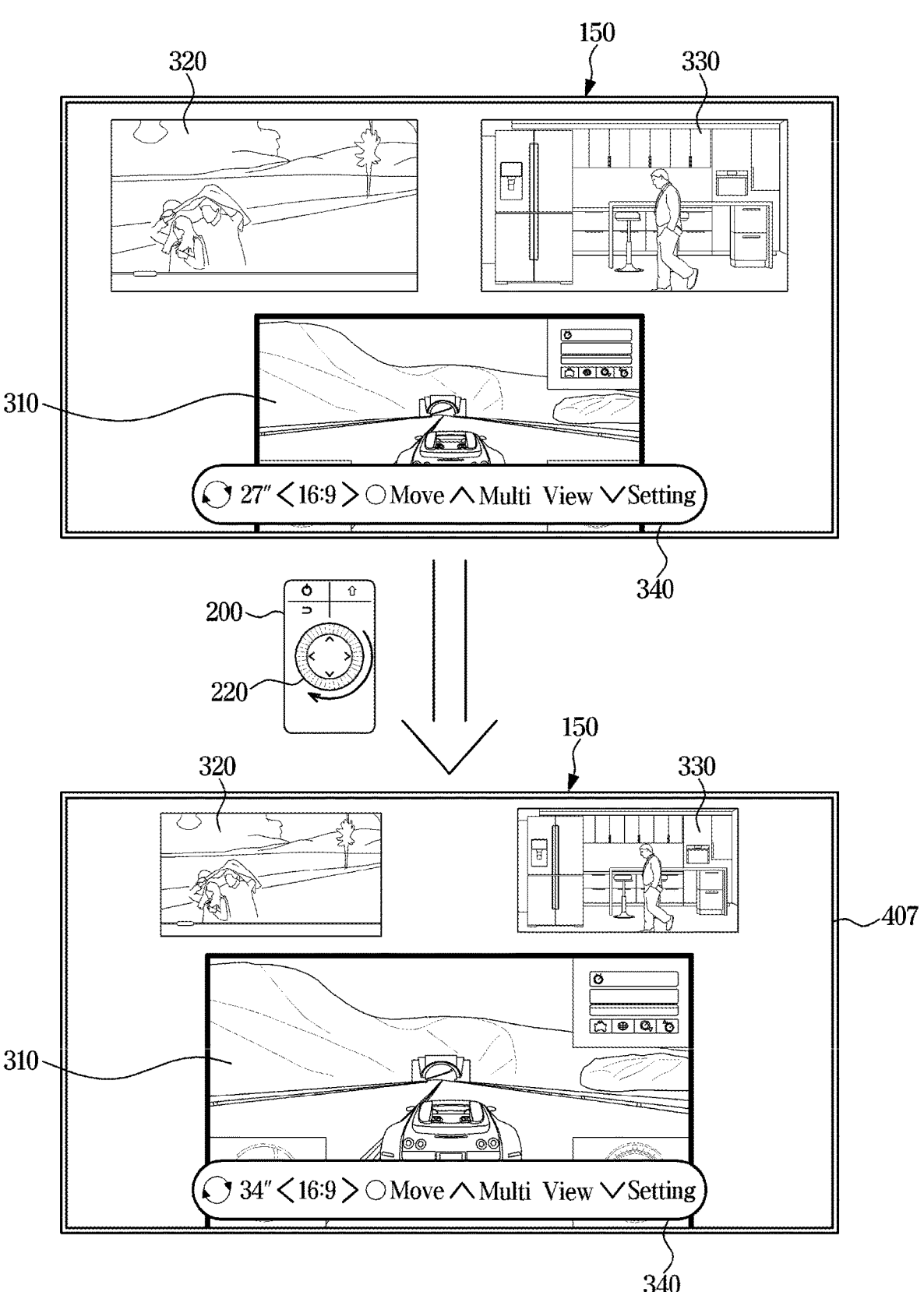
FIG. 10 illustrates an example in which a display apparatus scales up or down one of a plurality of content images, according to an embodiment.
Figure 11:
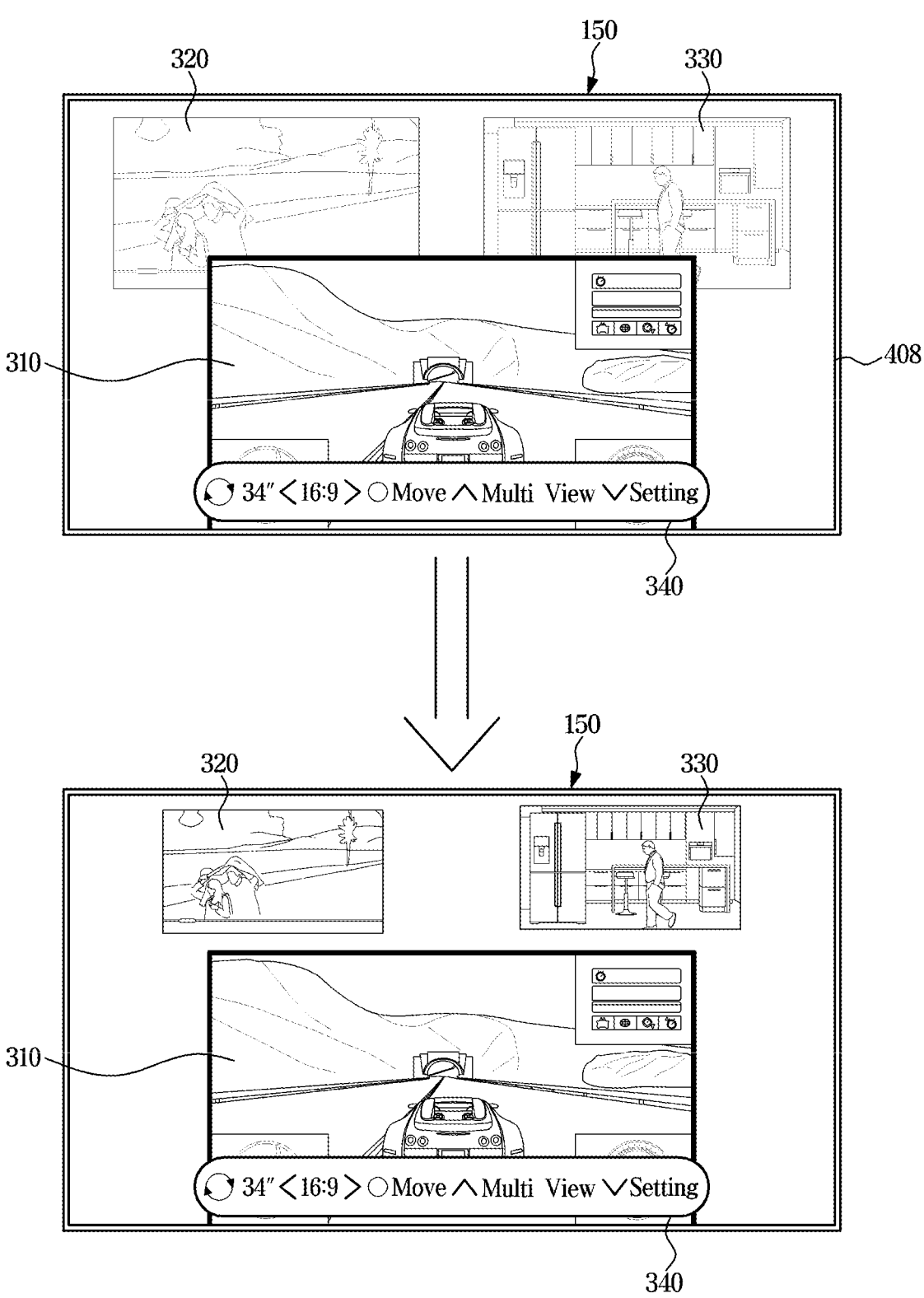
FIG. 11 illustrates an example in which a display apparatus scales up or down one of a plurality of content images, according to an embodiment.

FIGS. 10 and 11 illustrate an example in which a display apparatus scales up or down one of a plurality of content images, according to an embodiment.

The processor 180 may control the display 150 to display all of the first content image 310, the second content image 320 and a third content image 330 based on a user input through an external input device 200.

While the plurality of content images 310, 320 and 330 are displayed, the external input device 200 may obtain a user input from the user to scale up or down the first content image 310 displayed on the display 150.

For example, as shown in FIG. 10, the external input device 200 may obtain a user input that rotates the control knob 220 clockwise.

The processor 180 may control the display 150 to scale up the first content image 310 in response to the user input of rotating the control knob 220 clockwise.

As shown in FIG. 10, the processor 180 may control the display apparatus 100 to scale up the first content image 310 and simultaneously scale down the second content image 320 and the third content image 330 arranged along with the first content image 310, as shown in FIG. 10. In other words, the processor 180 may provide an image frame 407 with the first content image 310 scaled up and the second content image 320 and the third content image 330 scaled down to the display 150.

Furthermore, the processor 180 may control the display apparatus 100 to scale up and simultaneously overlap the first content image 310 on the second content image 320 and the third content image 330, as shown in FIG. 11. In other words, the processor 180 may provide an image frame 408 with the scaled-up first content image 310 overlapping on the second content image 320 and the third content image 330 to the display 150.

When the first content image is scaled up to be equal to the size of the image frame, the processor 180 may control the display 150 to remove the second content image and the third content image and display only the first content image.

Although the content image is shown as being scaled down or up in response to clockwise or counterclockwise rotation of the control knob 220 in FIGS. 10 and 11, it is not limited thereto. For example, the content image may be scaled down or up in response to operation of the up key 212 or operation of the down key 213. Alternatively, the content image may be scaled down or up in response to operation of the right key 214 or operation of the left key 215.

Figure 12:
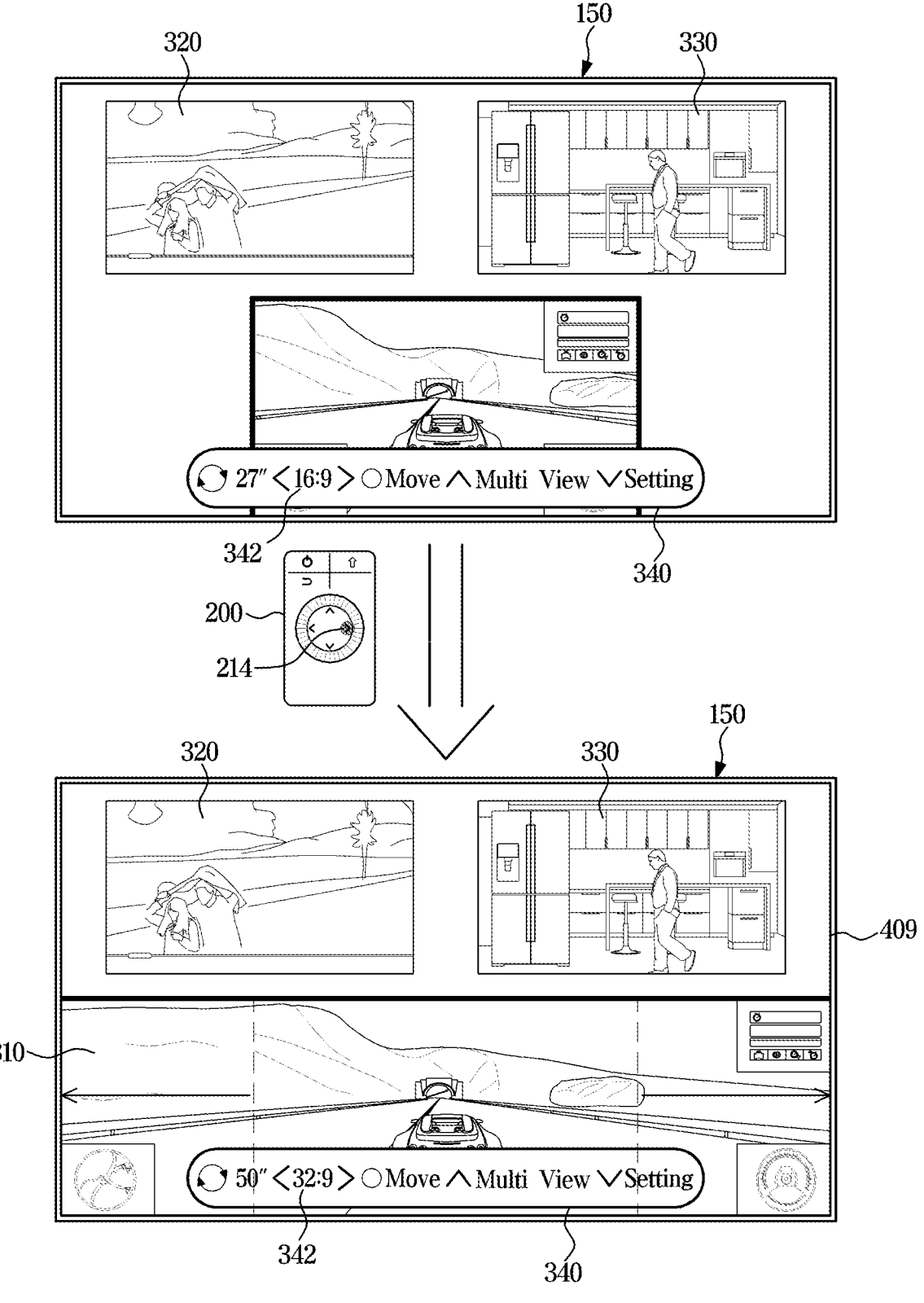
FIG. 12 illustrates an example in which a display apparatus changes an aspect ratio of one of a plurality of content images, according to an embodiment.
Figure 13:
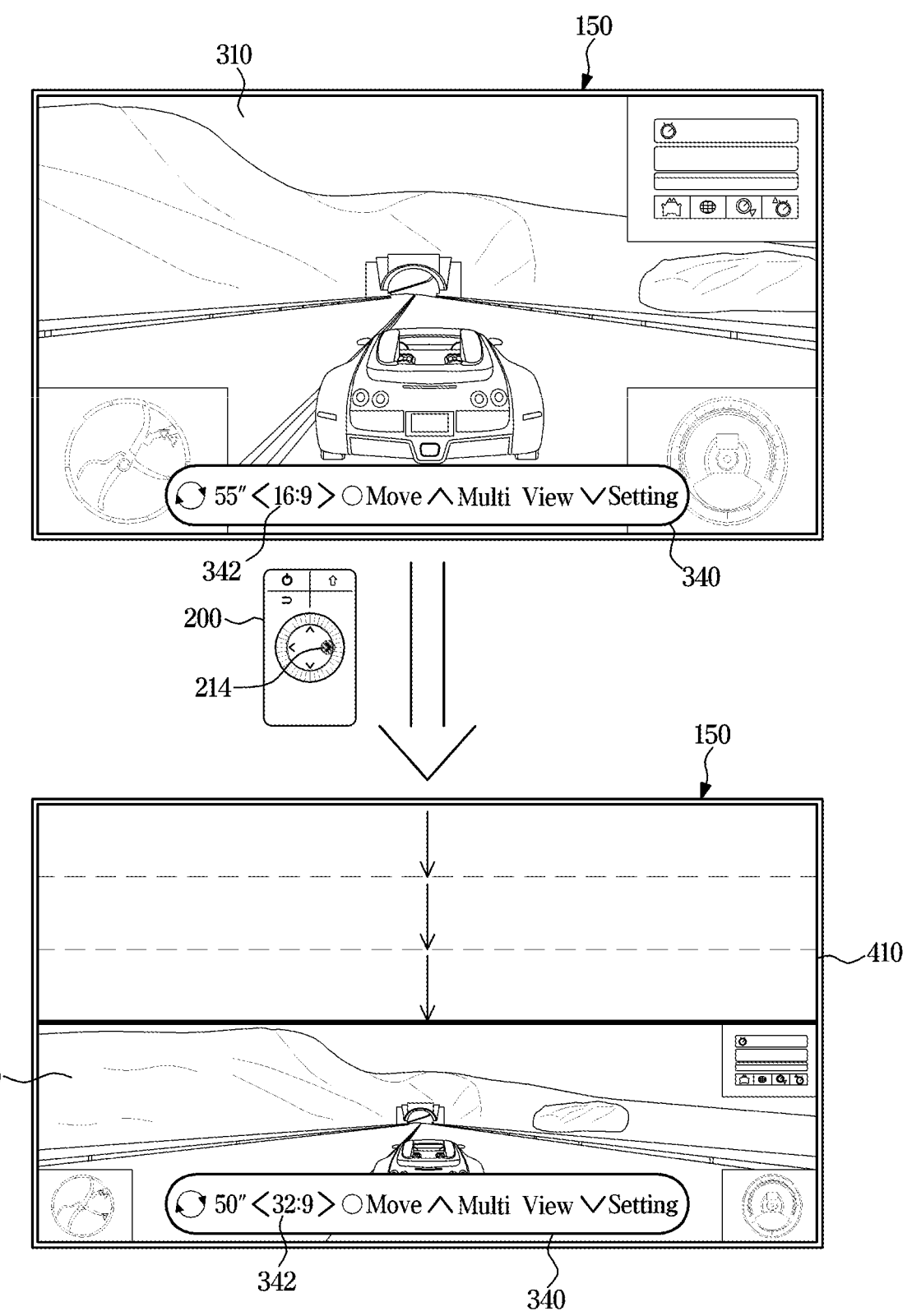
FIG. 13 illustrates an example in which a display apparatus changes an aspect ratio of one of a plurality of content images, according to an embodiment.

FIGS. 12 and 13 illustrate an example in which a display apparatus changes an aspect ratio of one of a plurality of content images, according to an embodiment.

The external input device 200 may obtain a user input from the user to change an aspect ratio of the first content image 310 displayed on the display 150.

The aspect ratio may indicate a ratio between a horizontal width of the image (or horizontal resolution) and a vertical height of the image (or vertical resolution). In general, the aspect ratio may be represented by "horizontal width (or horizontal resolution):vertical height (vertical resolution)". An increase in aspect ratio may represent an increase in horizontal width for the vertical height of the image, and a decrease in aspect ratio may represent a decrease in horizontal width for the vertical height of the image.

For example, as shown in FIG. 12, the processor 180 may control the display 150 to display all of the first content image 310, the second content image 320 and a third content image 330.

The external input device 200 may obtain a user input that operates the right key 214 while the plurality of content images 310, 320 and 330 are displayed.

The processor 180 may control the display 150 to increase the aspect ratio of the first content image 310 in response to the user input of operating the right key 214 of the external input device 200.

As shown in FIG. 12, the processor 180 may control the display 150 to increase the width (or horizontal resolution) of the first content image 310 while keeping the height (or vertical resolution) of the first content image 310. In other words, the processor 180 may provide an image frame 409 including the first content image 310 with the increased aspect ratio to the display 150.

The processor 180 may indicate a change in aspect ratio of the first content image 310 on the key guide 340 while changing the aspect ratio of the first content image 310. For example, the processor 180 may control the display 150 to display the aspect ratio (e.g., 16:9 as shown in FIG. 12) of the first content image 310 in the second guide image 342 of the key guide 340. The processor 180 may control the display 150 to display the changed aspect ratio (32:9 as shown in FIG. 12) of the first content image 310 in the second guide image 342, in response to the user input of operating the right key 214.

The external input device 200 may obtain a user input of operating the left key 215. The processor 180 may reduce the aspect ratio of the first content image 310 in response to a remote control signal from the external input device 200. The processor 180 may maintain the height (or vertical resolution) of the first content image 310 and reduce the width (or horizontal resolution) of the first content image 310.

In another example, as shown in FIG. 13, the processor 180 may control the display 150 to display the first content image 310 on the full screen 102.

While the first content image 310 is displayed on the full screen 102, the external input device 200 may obtain a user input that operates the right key 214.

The processor 180 may control the display 150 to increase the aspect ratio of the first content image 310 in response to the user input of operating the right key 214 of the external input device 200.

As shown in FIG. 13, the processor 180 may reduce the height (or vertical resolution) of the first content image 310 while keeping the width (or horizontal resolution) of the first content image 310. Accordingly, the aspect ratio of the first content image 310 may increase. In other words, the processor 180 may provide an image frame 410 including the first content image 310 with the increased aspect ratio to the display 150.

The processor 180 may indicate the aspect ratio of the first content image 310 being changed on the key guide 340 while changing the aspect ratio of the first content image 310. For example, the processor 180 may control the display 150 to display the aspect ratio (e.g., 16:9 as shown in FIG. 13) of the first content image 310 in the second guide image 342 of the key guide 340. The processor 180 may control the display 150 to display the changed aspect ratio (32:9 as shown in FIG. 13) of the first content image 310 in the second guide image 342, in response to the user input of operating the right key 214.

The external input device 200 may obtain a user input of operating the left key 215. The processor 180 may reduce the aspect ratio of the first content image 310 in response to a remote control signal from the external input device 200. The processor 180 may reduce the width (or horizontal resolution) of the first content image 310 while keeping the height (or vertical resolution) of the first content image 310.

In FIGS. 12 and 13, it is shown that the aspect ratio of content image increases or decreases in response to operation of the right key 214 or the left key 215. However, it is not limited thereto. For example, the content image may be scaled down or up in response to operation of the up key 212 or operation of the down key 213. The content image may be scaled down or up in response to clockwise or counterclockwise rotation of the control knob 220.

Figure 14:
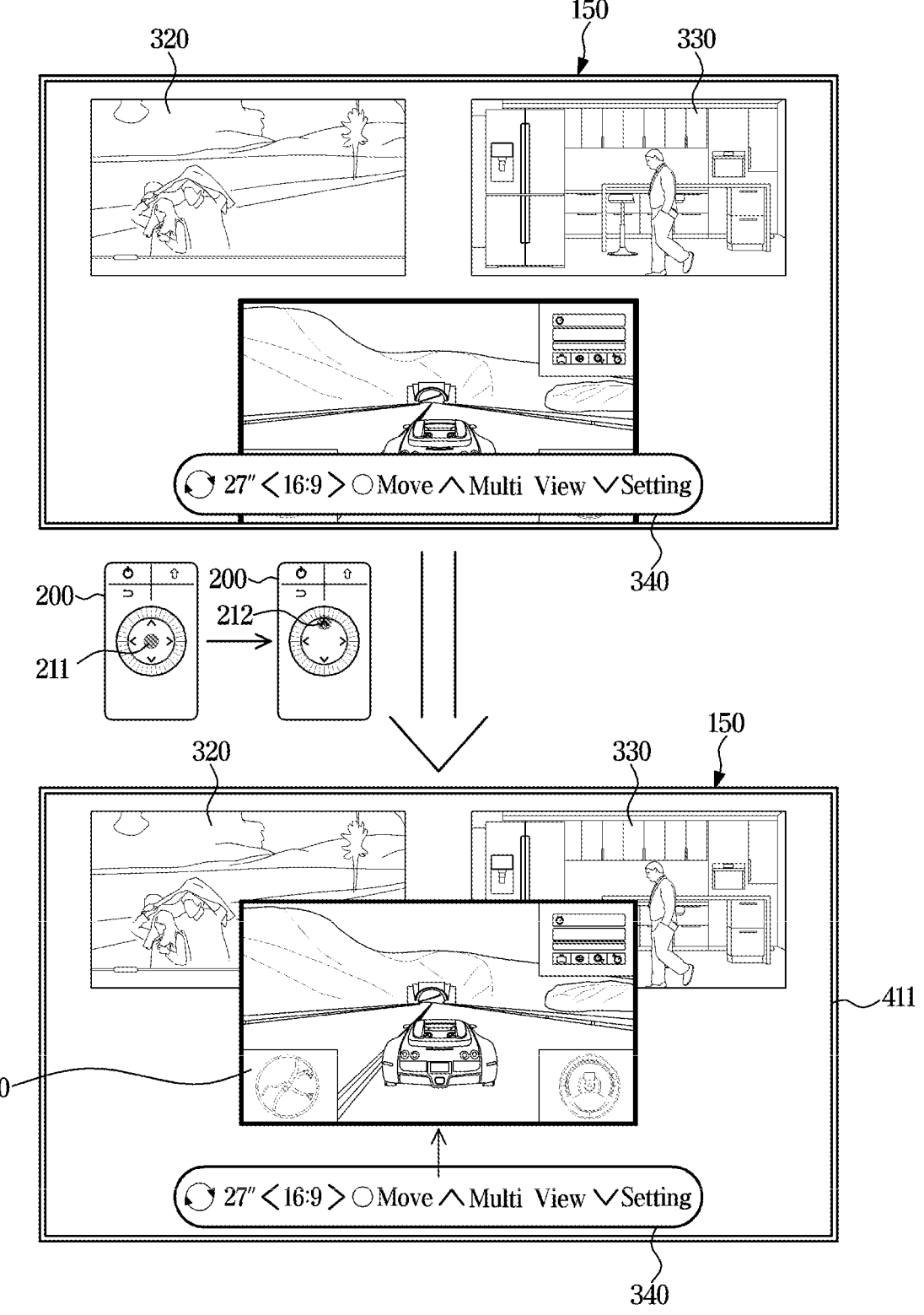
FIG. 14 illustrates an example in which a display apparatus moves one of a plurality of content images, according to an embodiment.
Figure 15:
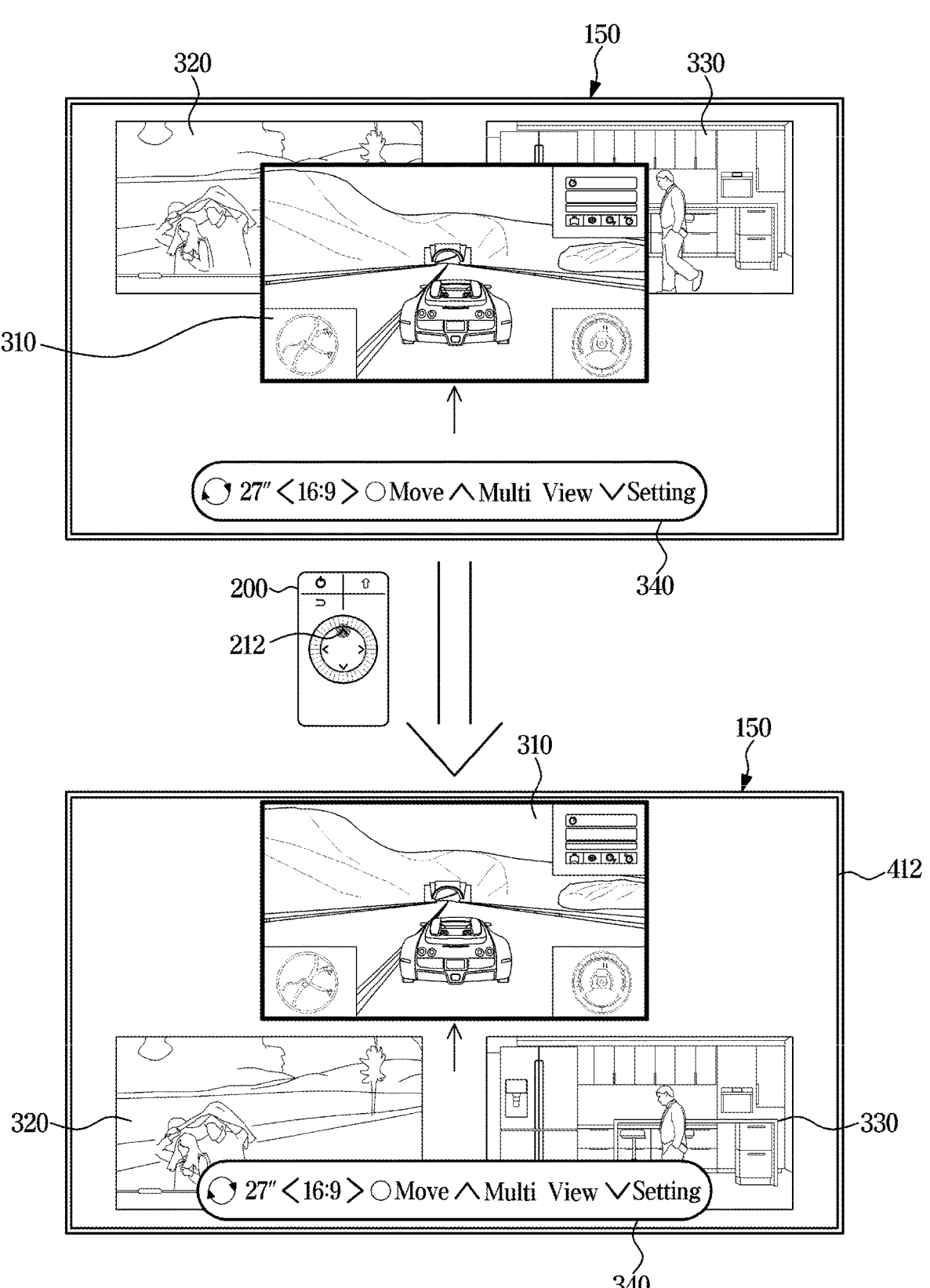
FIG. 15 illustrates an example in which a display apparatus moves one of a plurality of content images, according to an embodiment.

FIGS. 14 and 15 illustrate an example in which a display apparatus moves one of a plurality of content images, according to an embodiment.

The processor 180 may control the display 150 to display all of the first content image 310, the second content image 320 and a third content image 330.

The external input device 200 may obtain a user input from the user to move the first content image 310 displayed on the display 150.

As shown in FIG. 14, the external input device 200 may obtain a user input of operating the center key 211 and operating one (e.g., the up key) of the directional keys 212, 213, 214 and 215.

The processor 180 may move the first content image 310 within the image frame in response to the user input of operating the center key 211 of the external input device 200 and operating one (e.g., up key) of the directional keys 212, 213, 214 and 215.

The processor 180 may move up the first content image 310 in response to a user input of operating the up key 212, and move down the first content image 310 in response to a user input of operating the down key 213. Furthermore, the processor 180 may move the first content image 310 to the right in response to a user input of operating the right key 214, and move the first content image 310 to the left in response to a user input of operating the left key 215.

A user input to move the first content image 310 toward the second content image 320 and/or the third content image 330 may be input.

For example, as shown in FIG. 14, the second content image 320 and/or the third content image 330 may be arranged on the first content image 310, and a user input of operating the up key 212 may be input.

The processor 180 may control the display 150 to overlap the first content image 310 moved on the second content image 320 and/or the third content image 330 based on the user input to move the first content image 310 toward the second content image 320 and/or the third content image 330. In other words, the processor 180 may provide an image frame 411 with the first content image 310 moved overlapping on the second content image 320 and/or the third content image 330 to the display 150.

The processor 180 may control the display 150 to continue to move the first content image 310 with the first content image 310 overlapping on the second content image 320 and/or the third content image 330 while the user input is continued, as shown in FIG. 14.

The processor 180 may control the display 150 to stop moving the first content image 310 based on termination of the user input. Along with this, the processor 180 may control the display 150 to display the second content image 320 and/or the third content image 330 in a region that is not occupied by the first content image 310.

For example, as shown in FIG. 15, the processor 180 may provide an image frame 412 with the second content image 320 and/or the third content image 330 displayed under the first content image 310 to the display 150, in response to termination of a user input of operating the up key 212.

Although a content image is shown as being moved up in response to operation of the up key 212 in FIGS. 14 and 15, it is not limited thereto. For example, the content image may be moved down in response to operation of the down key 213, or moved to the right in response to operation of the right key 214, or moved to the left in response to operation of the left key 215.

Figure 16:
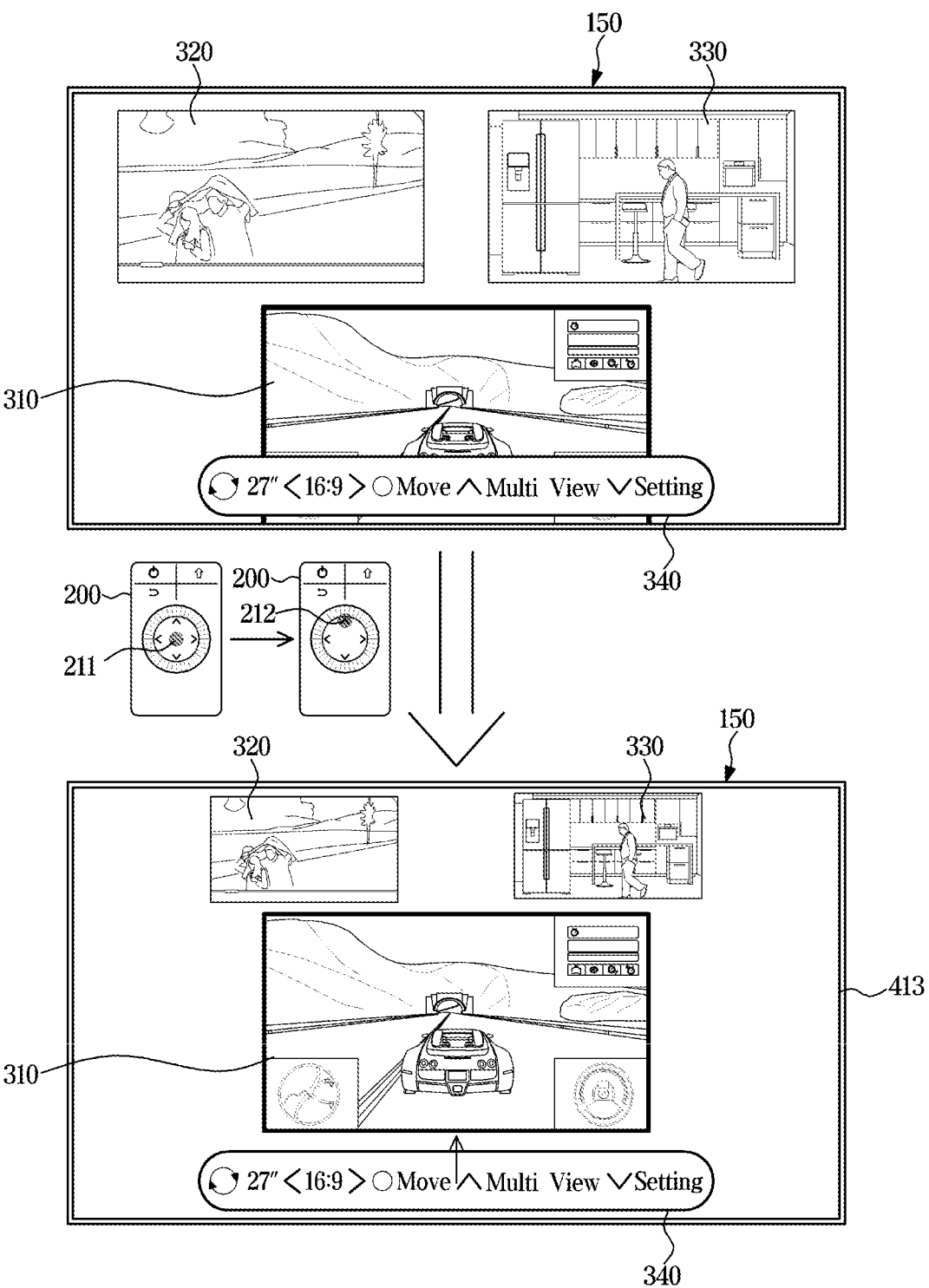
FIG. 16 illustrates an example in which a display apparatus moves one of a plurality of content images, according to an embodiment.
Figure 17:
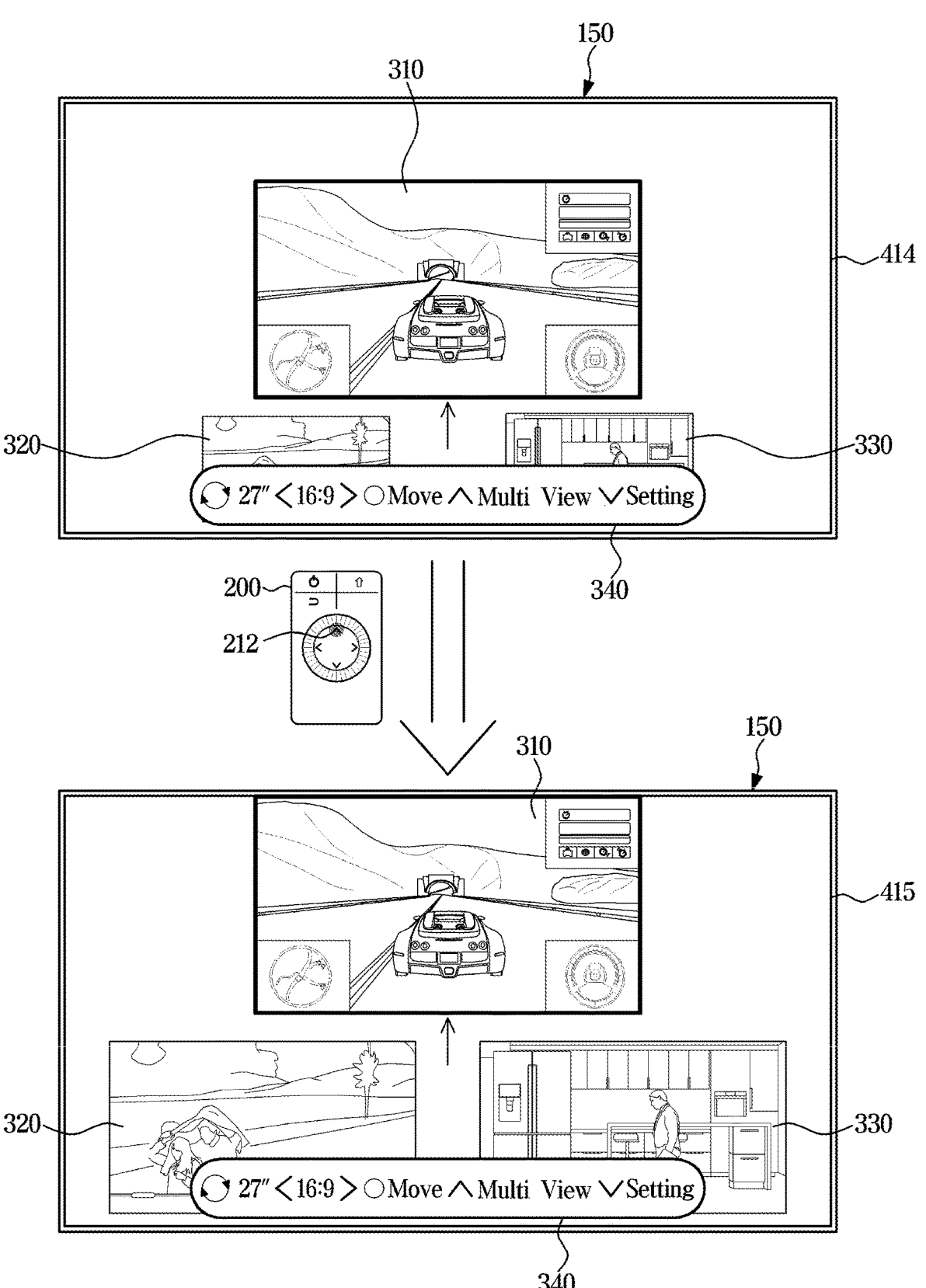
FIG. 17 illustrates an example in which a display apparatus moves one of a plurality of content images, according to an embodiment.

FIGS. 16 and 17 illustrate an example in which a display apparatus moves one of a plurality of content images, according to an embodiment.

As shown in FIG. 16, the processor 180 may control the display 150 to display all of the first content image 310, the second content image 320 and a third content image 330.

The external input device 200 may obtain a user input from the user to move the first content image 310 displayed on the display 150.

For example, the external input device 200 may obtain a user input of operating the center key 211 and then operating one (e.g., the up key) of the directional keys 212, 213, 214 and 215.

The processor 180 may move the first content image 310 within the image frame in response to the user input of operating the center key 211 of the external input device 200 and then operating one (e.g., the up key) of the directional keys 212, 213, 214 and 215.

The processor 180 may control the display 150 to scale down the second content image 320 and/or the third content image 330 based on the user input to move the first content image 310 toward the second content image 320 and/or the third content image 330. Accordingly, as shown in FIG. 16, the first content image 310 may not overlap with the second content image 320 an/or the third content image 330.

The processor 180 may control the display 150 to keep moving the first content image 310 and continue to scale down the second content image 320 and/or the third content image 330 while the user input is continued.

The processor 180 may change positions of the second content image 320 and/or the third content image 330 depending on the position of the first content image 310 while moving the first content image 310.

For example, as shown in FIG. 16, the processor 180 may control the display 150 to scale down the second content image 320 and/or the third content image 330 while the center of the first content image 310 is being moved within a lower half region of the image frame 413.

As shown in FIG. 17, the processor 180 may control the display 150 to move the second content image 320 and/or the third content image 330 under the first content image 310 based on the center of the first content image 310 located in an upper half region of the image frame 414 while moving the first content image 310.

Subsequently, the processor 180 may control the display 150 to scale up the second content image 320 and/or the third content image 330 while the center of the first content image 310 is being moved within an upper half region of the image frame 415.

Furthermore, the content image may be moved down in response to operation of the down key 213, moved to the right in response to operation of the right key 214, or moved to the left in response to operation of the left key 215.

Figure 18:
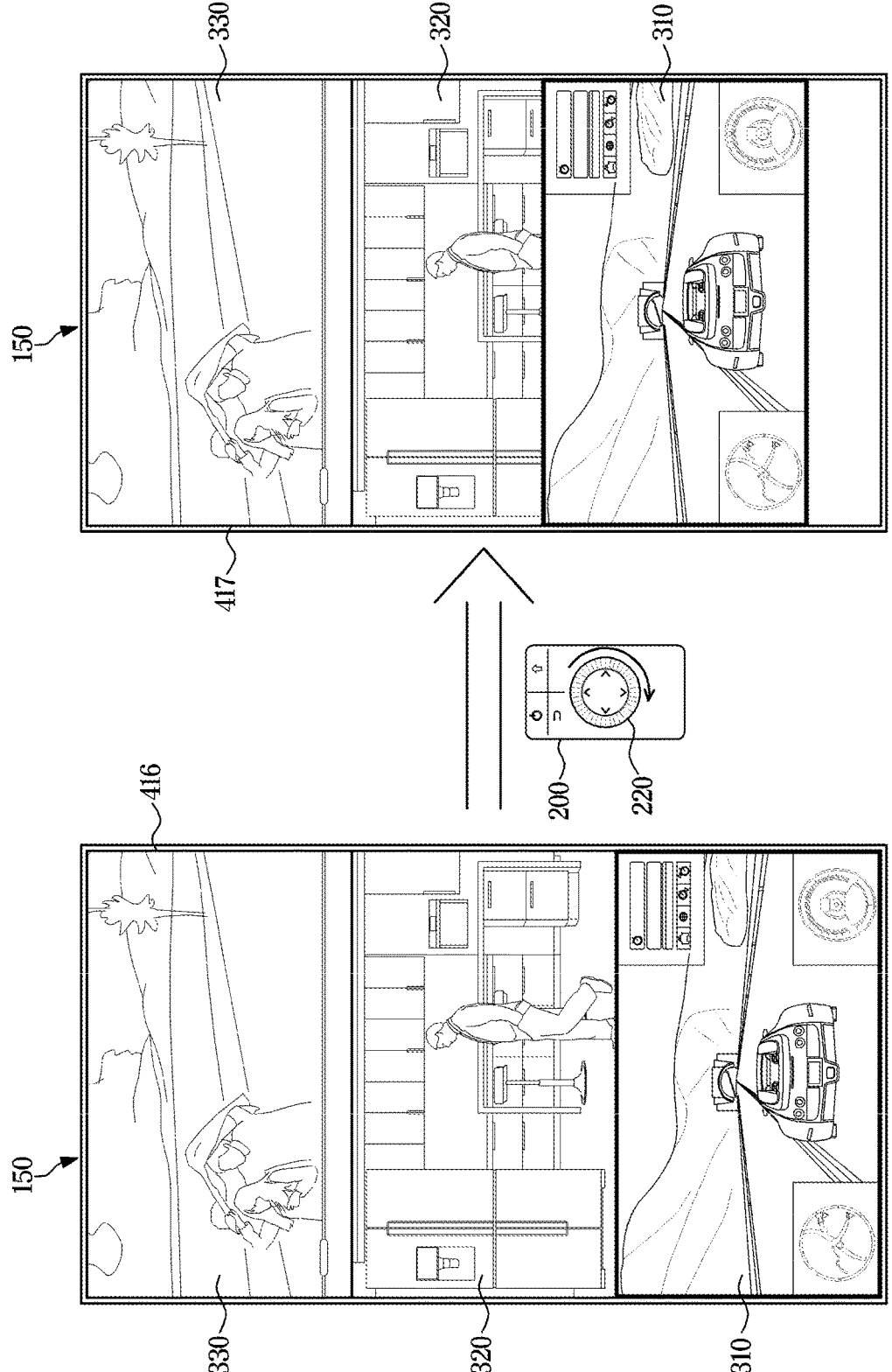
FIG. 18 illustrates an example in which a display apparatus moves one of a plurality of content images, according to an embodiment.
Figure 19:
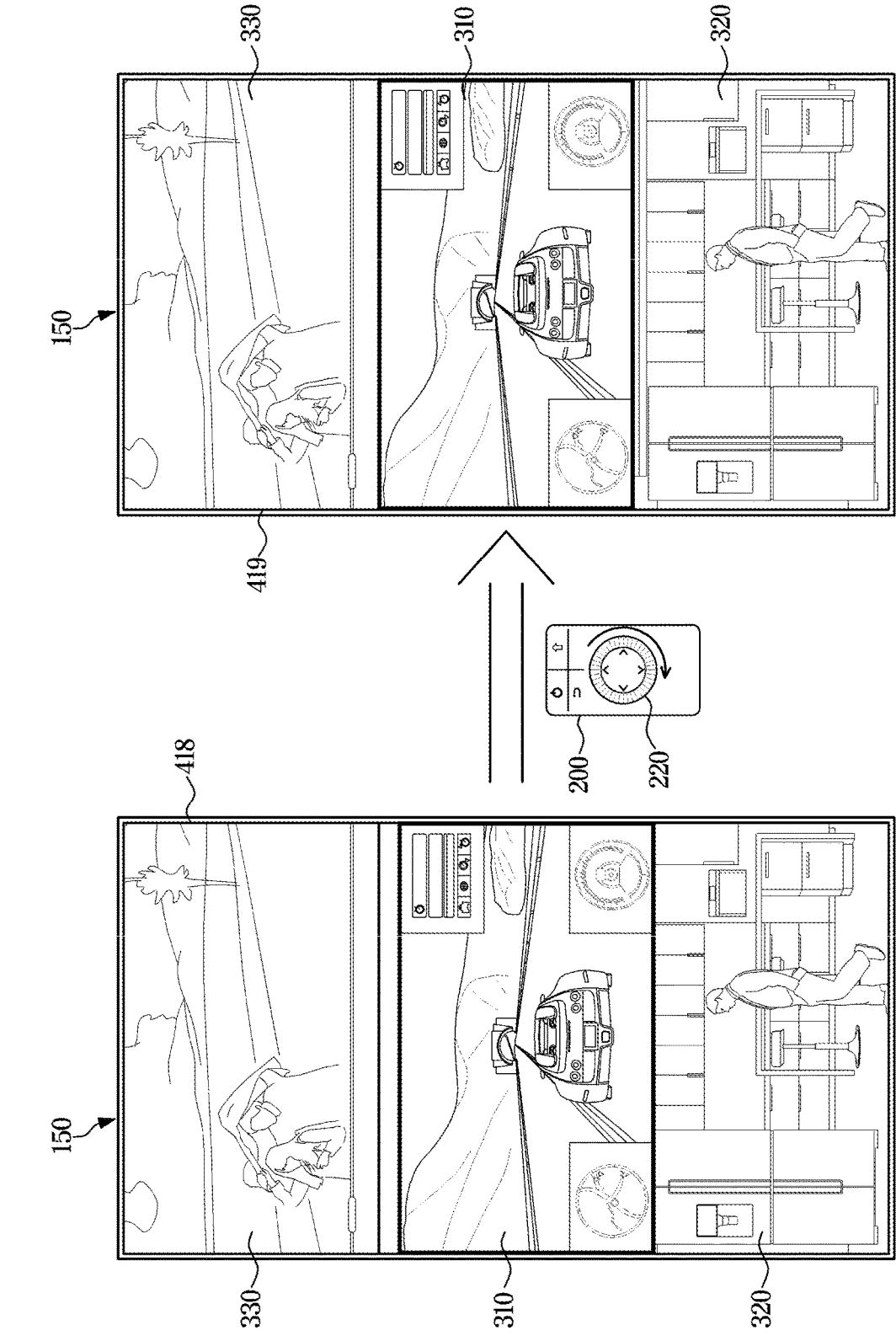
FIG. 19 illustrates an example in which a display apparatus moves one of a plurality of content images, according to an embodiment.

FIGS. 18 and 19 illustrate an example in which a display apparatus moves one of a plurality of content images, according to an embodiment.

As shown in FIGS. 18 and 19, the display apparatus 100 may be arranged to have a vertical height larger than the horizontal width.

The processor 180 may control the display 150 to display all of the first content image 310, the second content image 320 and a third content image 330. For example, as shown in FIG. 18, the processor 180 may control the display 150 to divide an image frame 416 into three portions and display the first content image 310, the second content image 320 and the third content image 330 in the three portions, respectively.

The external input device 200 may obtain a user input from the user to move the first content image 310 displayed on the display 150.

For example, as shown in FIG. 18, while the first content image 310 is selected, the external input device 200 may obtain a user input that rotates the control knob 220 clockwise.

The processor 180 may control the display 150 to move up the first content image 310 within an image frame 417 in response to the user input of rotating the control knob 220 clockwise. In other words, the processor 180 may control the display 150 to move the first content image 310 toward the second content image 320 and/or the third content image 330.

The processor 180 may control the display 150 to overlap the first content image 310 moved on the second content image 320 and/or the third content image 330 based on the user input to move the first content image 310 toward the second content image 320 and/or the third content image 330.

For example, the processor 180 may control the display 150 to overlap the first content image 310 on the second content image 320. In other words, the processor 180 may provide the image frame 417 with the first content image 310 moved overlapping on the second content image 320 to the display 150. In this case, the size of the second content image 320 may remain intact.

The processor 180 may control the display 150 to continue to move the first content image 310 with the first content image 310 overlapping on the second content image 320 while the user input is continued.

The processor 180 may change the position of the second content image 320 depending on the position of the first content image 310 while moving the first content image 310.

For example, as shown in FIG. 19, the processor 180 may control the display 150 to move down the second content image 320 based on the center of the first content image 310 located in a two third region of an image frame 418. Subsequently, the processor 180 may control the display 150 to display an image frame 419 with the position of the first content image 310 and the position of the second content image 320 are switched.

Although the content image is shown as being moved in response to clockwise or counterclockwise rotation of the control knob 220 in FIGS. 18 and 19, it is not limited thereto. For example, the content image may be moved in response to operation of the up key 212 or operation of the down key 213. Furthermore, the content image may be moved in response to operation of the right key 214 or operation of the left key 215.

Figure 20:
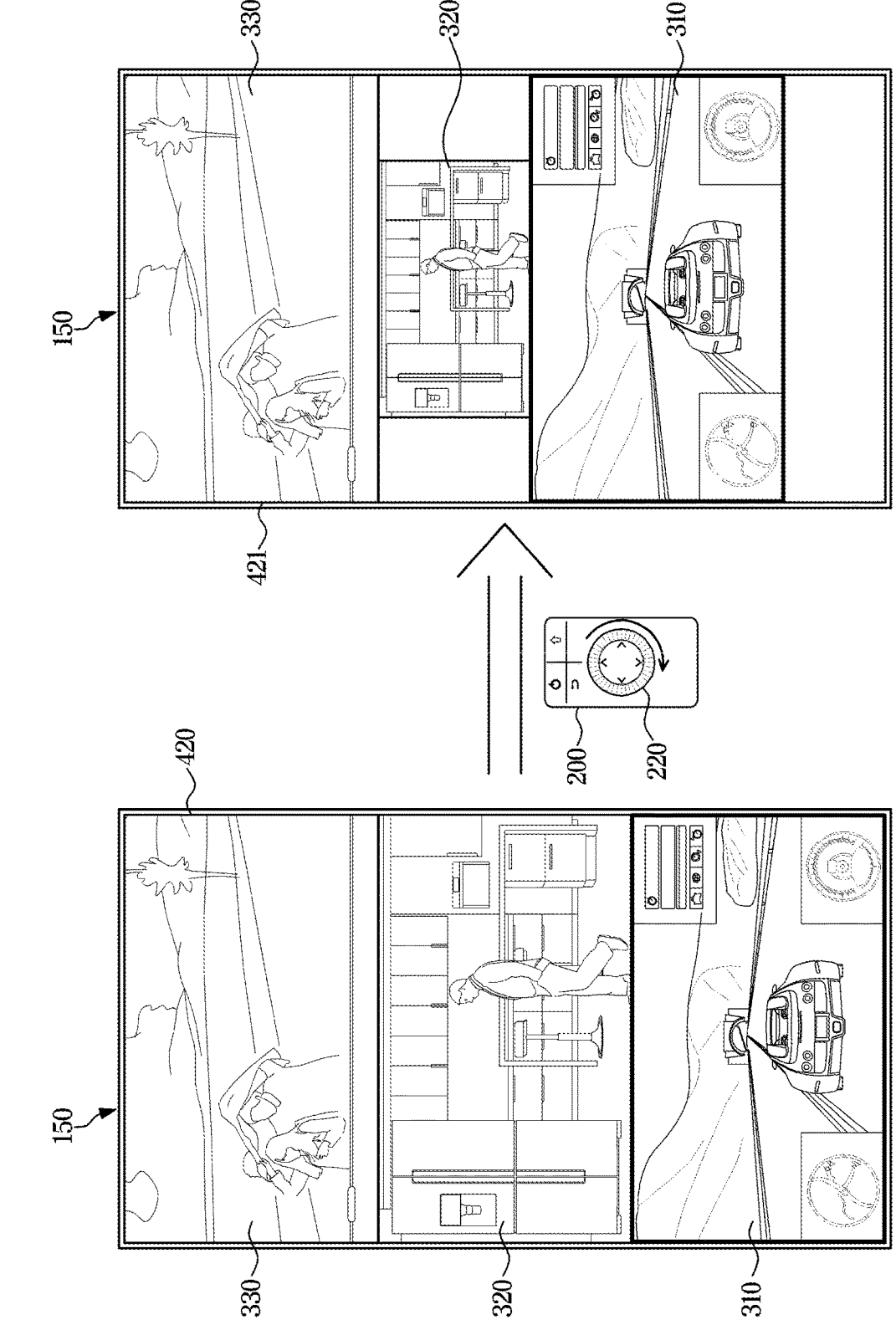
FIG. 20 illustrates an example in which a display apparatus moves one of a plurality of content images, according to an embodiment.
Figure 21:
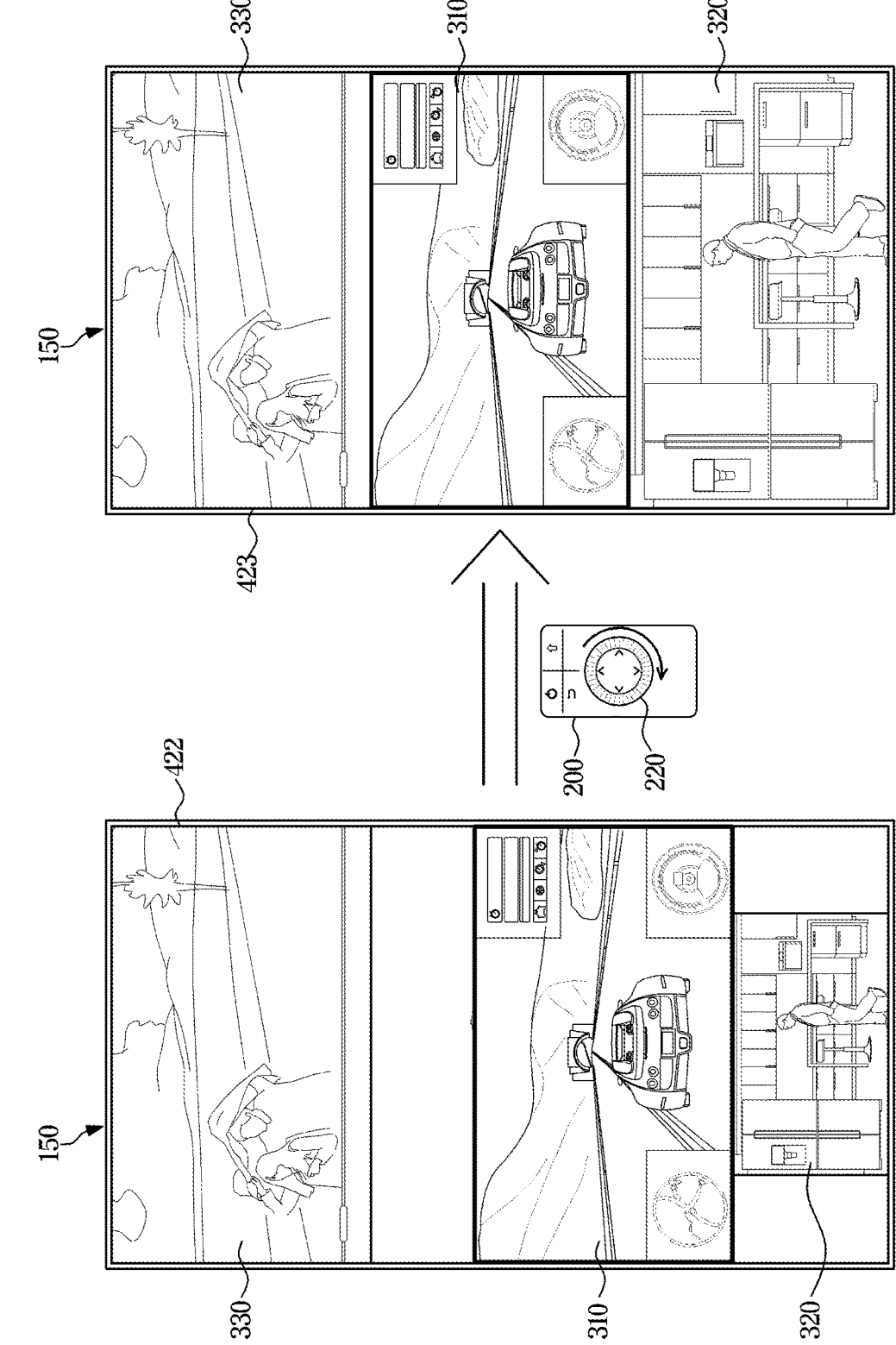
FIG. 21 illustrates an example in which a display apparatus moves one of a plurality of content images, according to an embodiment.

FIGS. 20 and 21 illustrate an example in which a display apparatus moves one of a plurality of content images, according to an embodiment.

As shown in FIGS. 20 and 21, the display apparatus 100 may be arranged to have a vertical height larger than the horizontal width.

For example, as shown in FIG. 20, the processor 180 may control the display 150 to divide an image frame 420 into three portions and display the first content image 310, the second content image 320 and the third content image 330 in the three portions, respectively.

As shown in FIG. 20, while the first content image 310 is selected, the external input device 200 may obtain a user input that rotates the control knob 220 clockwise.

The processor 180 may control the display 150 to move up the first content image 310 within an image frame 421 in response to the user input of rotating the control knob 220 clockwise.

The processor 180 may control the display 150 to scale down the second content image 320 adjacent to the first content image 310, based on the user input to move the first content image 310 toward the second content image 320 and/or the third content image 330. Accordingly, while the first content image 310 is being moved, the first content image 310 may not overlap the second content image 320.

The processor 180 may control the display 150 to keep moving the first content image 310 and scaling down the second content image 320 while the user input is continued.

The processor 180 may change the position of the second content image 320 depending on the position of the first content image 310 while moving the first content image 310.

For example, as shown in FIG. 21, the processor 180 may control the display 150 to move down the second content image 320 based on the center of the first content image 310 located in the two third region of an image frame 422.

Subsequently, the processor 180 may control the display 150 to keep scaling up the second content image 320 while moving the first content image 310. Furthermore, the processor 180 may control the display 150 to display an image frame 423 with the position of the first content image 310 and the position of the second content image 320 are switched.

Moreover, the content image may be moved in response to operation of the up key 212 or operation of the down key 213, or the content image may be moved in response to operation of the right key 214 or operation of the left key 215.

Changing a layout of content images in response to a user input to the external input device 200 has thus far been described.

Changing image parameters of content images in response to a user input to the external input device 200 will now be described.

Figure 22:
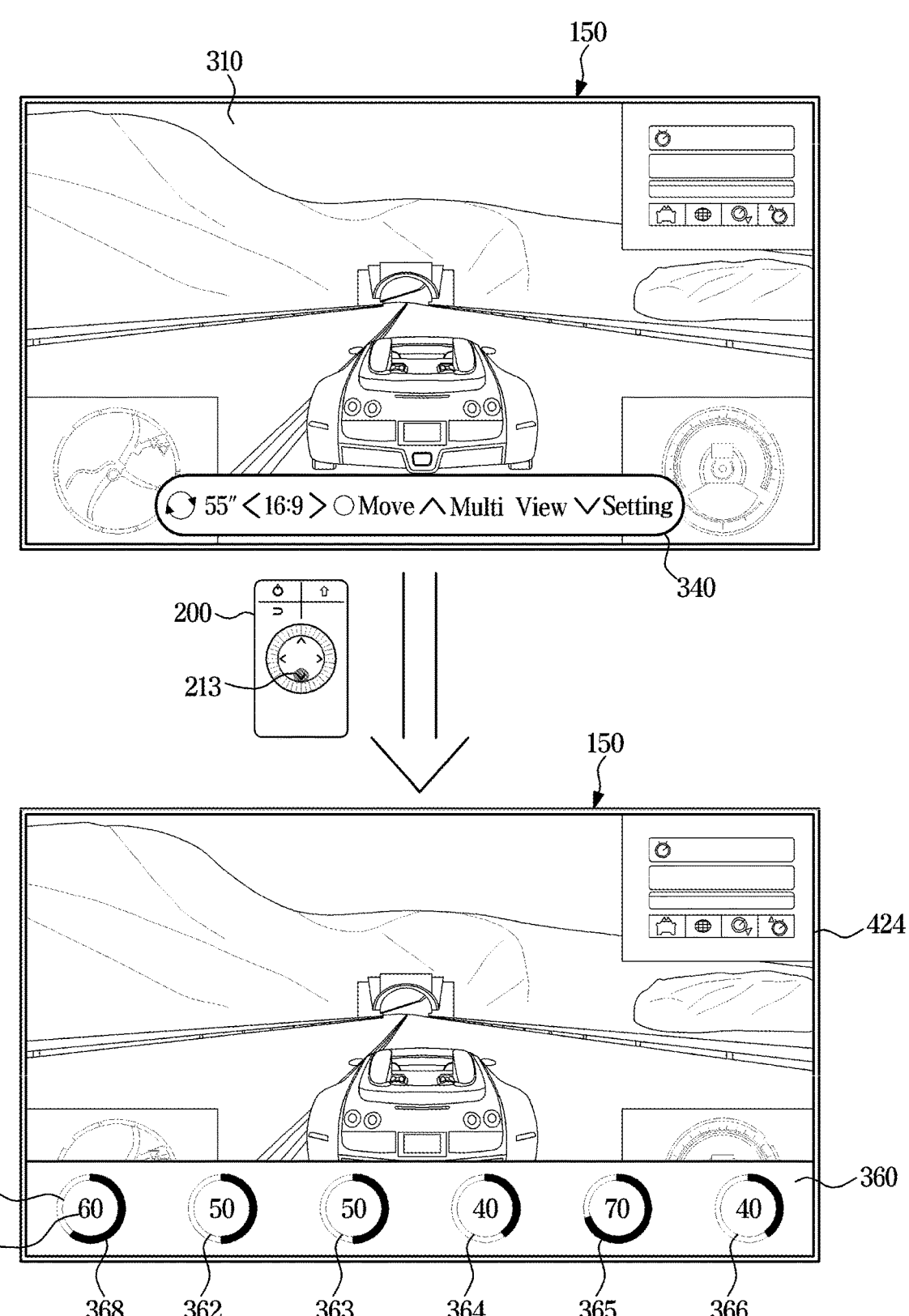
FIG. 22 illustrates an example in which a display apparatus changes image parameters of a content image, according to an embodiment.

FIG. 22 illustrates an example in which a display apparatus changes image parameters of a content image, according to an embodiment.

In an edit mode, the processor 180 may control the display 150 to display the key guide 340 on the first content image 310.

While the key guide 340 is displayed, the external input device 200 may obtain a user input from the user to change an image parameter of the first content image 310 displayed on the display 150.

For example, as shown in FIG. 22, the external input device 200 may obtain a user input that operates the down key 213.

The processor 180 may control the display 150 to display the parameter guide 360 to change an image parameter of the content image on the first content image 310 in response to a user input of operating the down key 213 of the external input device 200. In other words, the processor 180 may provide an image frame 424 including a parameter guide 360 to the display 150.

The parameter guide 360 may include a first parameter guide 361 for setting a first image parameter (e.g., brightness), a second parameter guide 362 for setting a second image parameter (e.g., contrast), a third parameter guide 363 for setting a third image parameter (e.g., definition), a fourth parameter guide 364 for setting a fourth image parameter (e.g., a red value), a fifth parameter guide 365 for setting a fifth image parameter (e.g., a green value), and a sixth parameter guide 366 for setting a sixth image parameter (e.g., a blue value).

Each of the parameter guides 361, 362, 363, 364, 365 and 366 may include a circle 367, and each image parameter value may be displayed in the circle 367. Furthermore, a circular arc 368 having an angle corresponding to each image parameter value may be displayed on the edge of the circle 367.

While the parameter guide 360 is displayed, the external input device 200 may obtain a user input to select an image parameter to change a setting value. For example, the external input device 200 may obtain a user input that operates the center key 211 following operation of the right key 214 or the left key 215.

After the image parameter for changing the setting value is selected, the external input device 200 may obtain a user input to select the setting value. For example, the external input device 200 may obtain a user input of rotating the control knob 220 clockwise or counterclockwise. The processor 180 may increase the setting value of the image parameter in response to the user input of rotating the control knob 220 clockwise, and decrease the setting value of the image parameter in response to the user input of rotating the control knob 220 counterclockwise.

As such, the user may use the external input device 200 including the control knob 220 and the directional keys 210 to easily change not only the layout of the content images but also an image parameter of each content image.

Figure 23:
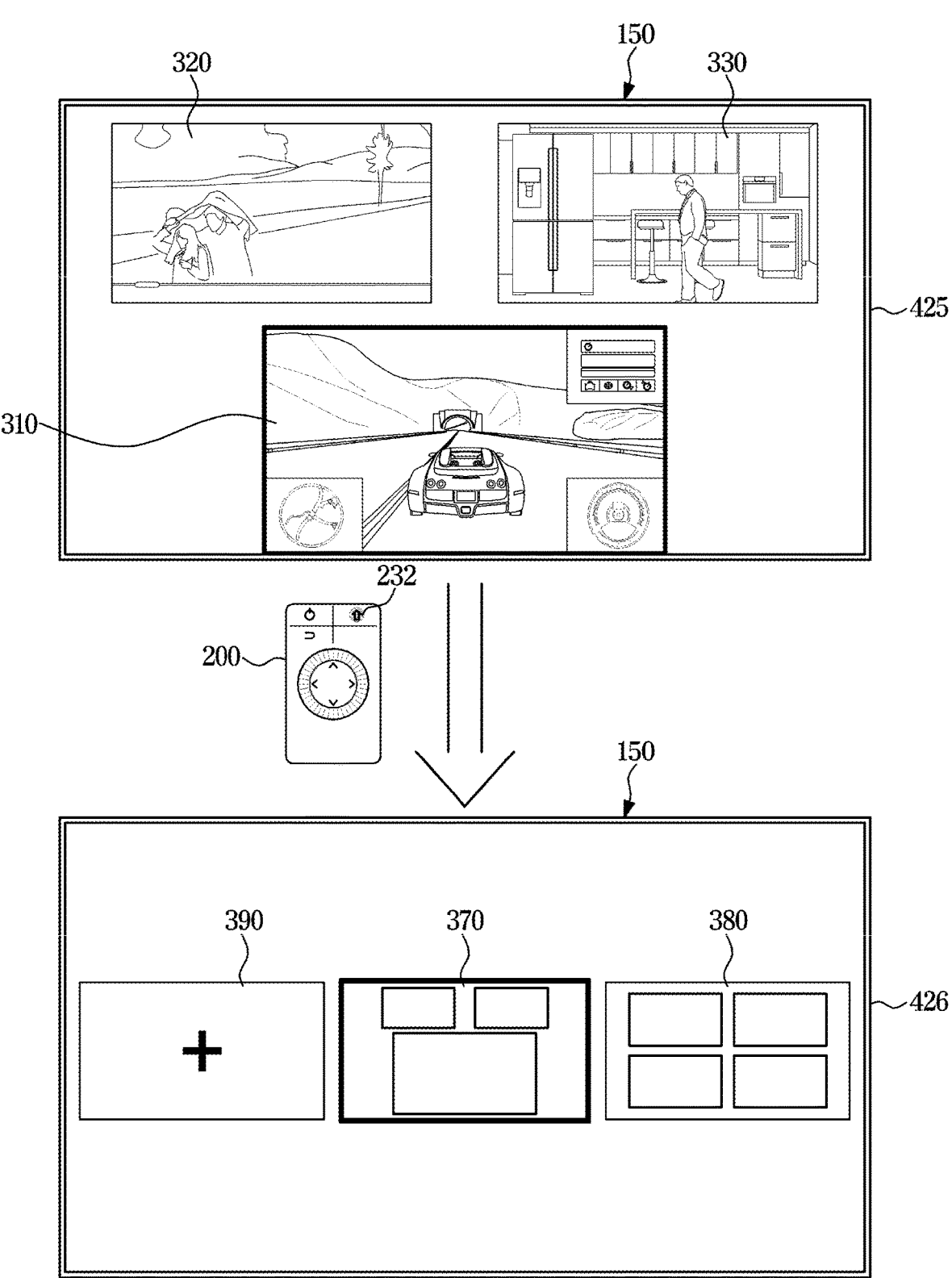
FIG. 23 illustrates an example in which a display apparatus stores a layout of content images, according to an embodiment.
Figure 24:
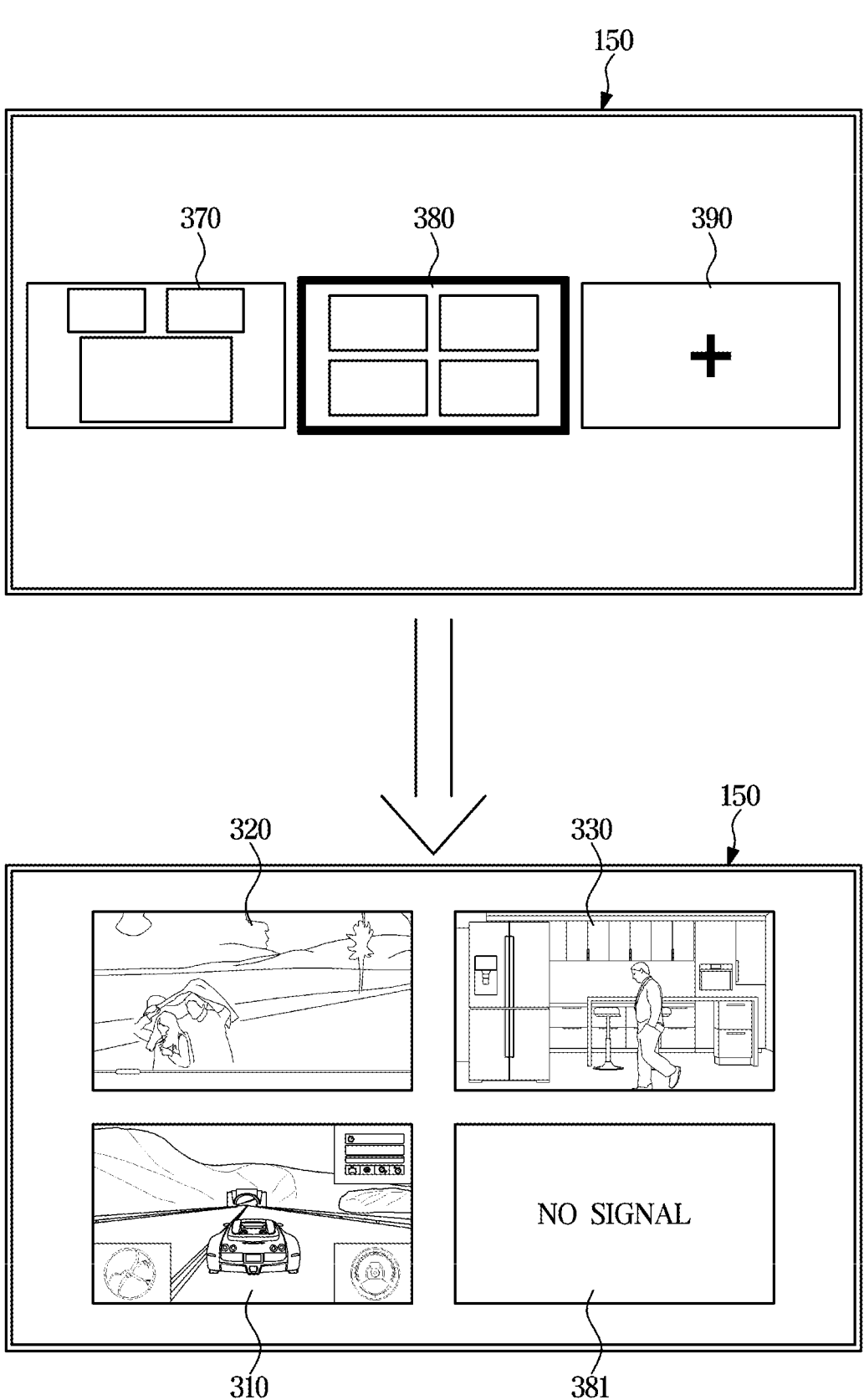
FIG. 24 illustrates an example in which a display apparatus calls in a layout of content images, according to an embodiment.

FIG. 23 illustrates an example in which a display apparatus stores a layout of content images, according to an embodiment. FIG. 24 illustrates an example in which a display apparatus calls in a layout of content images, according to an embodiment.

The processor 180 may control the display 150 to display an image frame 425 including all of the first content image 310, the second content image 320 and the third content image 330.

The external input device 200 may obtain a user input from the user to store a layout of the content images 310, 320 and 330 displayed on the display 150. For example, as shown in FIG. 23, the external input device 200 may obtain a user input that operates the home key 232.

The processor 180 may store a current layout of the content images 310, 320 and 330 in the memory 181 in response to a user input of operating the home key 232 of the external input device 200.

For example, the processor 180 may store the size and position of each of the content images 310, 320 and 330 and store respective content sources of the content images 310, 320 and 330. Data about the stored layout may include data about the size and position of each of the content images 310, 320 and 330 and data about the content sources of the respective content images 310, 320 and 330.

The processor 180 may control the display 150 to display an image frame 426 to change the layout of the content images 310, 320 and 330 in response to a user input of operating the home key 232 of the external input device 200.

For example, as shown in FIG. 23, the image frame 426 may include a first layout image 370 representing a layout of the content images 310, 320 and 330 in the image frame 425, a second layout image 380 representing a different layout from the first layout image 370, and an add layout image 390 for adding a layout.

Each of the layout images 370 and 380 may simply represent a layout of the content images included therein. For example, each of the layout images 370 and 380 may represent the number of content images, a layout of the content images, etc.

The user may input a user input to change the layout of the content images to the external input device 200.

For example, the external input device 200 may obtain a user input that operates the center key 211 following an operation of the right key 214 or the left key 215.

The processor 180 may change a layout option of the content images in response to a user input that operates the center key 211 following operation of the right key 214 or the left key 215. For example, as shown in FIG. 24, an activated layout image may be changed from the first layout image 370 to the second layout image 380.

The external input device 200 may obtain the user input to select a layout associated with the activated layout image. For example, the external input device 200 may obtain a user input of operating the center key 211.

The processor 180 may obtain layout data associated with the second layout image 380 from the memory 181 in response to the user input of operating the center key 211 of the external input device 200. For example, the processor 180 may obtain layout data including positions and content sources of the content images.

For example, as shown in FIG. 24, the processor 180 may control the display 150 to display the first content image 310, the second content image 320, the third content image 330 and a fourth content image 381 based on layout data associated with the second layout image 380.

Each content image may include an image obtained from the associated content source. For example, the first content image 310 may include an image received from a first content source, the second content image 320 may include an image received from a second content source, and the third content image 330 may include an image received from a third content source. When the display apparatus 100 is not connected to a fourth content source associated with the fourth content image 381, the fourth content image 381 representing no signal may be displayed as shown in FIG. 24.

Figure 25:
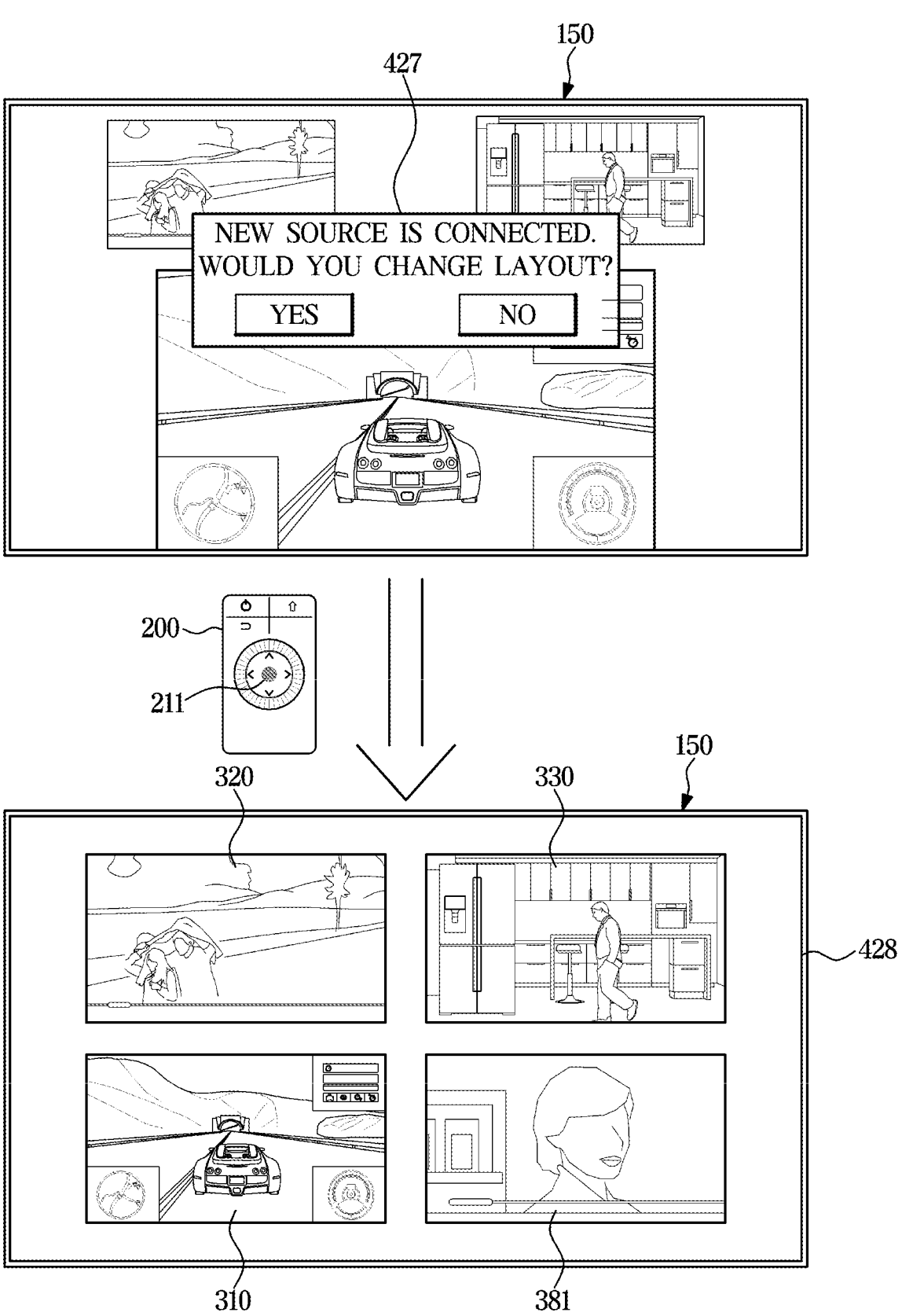
FIG. 25 illustrates an example in which a display apparatus is connected to a new content source, according to an embodiment.

FIG. 25 illustrates an example in which a display apparatus is connected to a new content source, according to an embodiment.

While the display apparatus 100 is operating, a new content source may be connected to the display apparatus 100. For example, a USB storage medium may be inserted to the third receive terminal 133.

The processor 180 may control the display 150 to display a message indicating that a new content source is connected, based on the connection of the new content source to the display apparatus 100. For example, the processor 180 may control the display 150 to display a message box 427 including a message inquiring whether to change the layout to display a content image from the new content source, as shown in FIG. 25.

The external input device 200 may obtain a user input to change a layout to display the new content image.

The processor 180 may change the layout of the content images in response to the user input through the external input device 200. For example, the processor 180 may control the display 150 to display the first content image 310, the second content image 320, the third content image 330, and the fourth content image 381, as shown in FIG. 25. In other words, the processor 180 may provide an image frame 428 with the first content image 310, the second content image 320, the third content image 330, and the fourth content image 381 arranged in parallel to the display 150.

As such, the display apparatus 100 may notify connection of the new content source to the user, and output content from the new content source without discontinuity in the existing content. Hence, the user may easily perceive the connection of the new content source, and may watch the new content from the new content source without discontinuity in watching the existing content.

Figure 26:
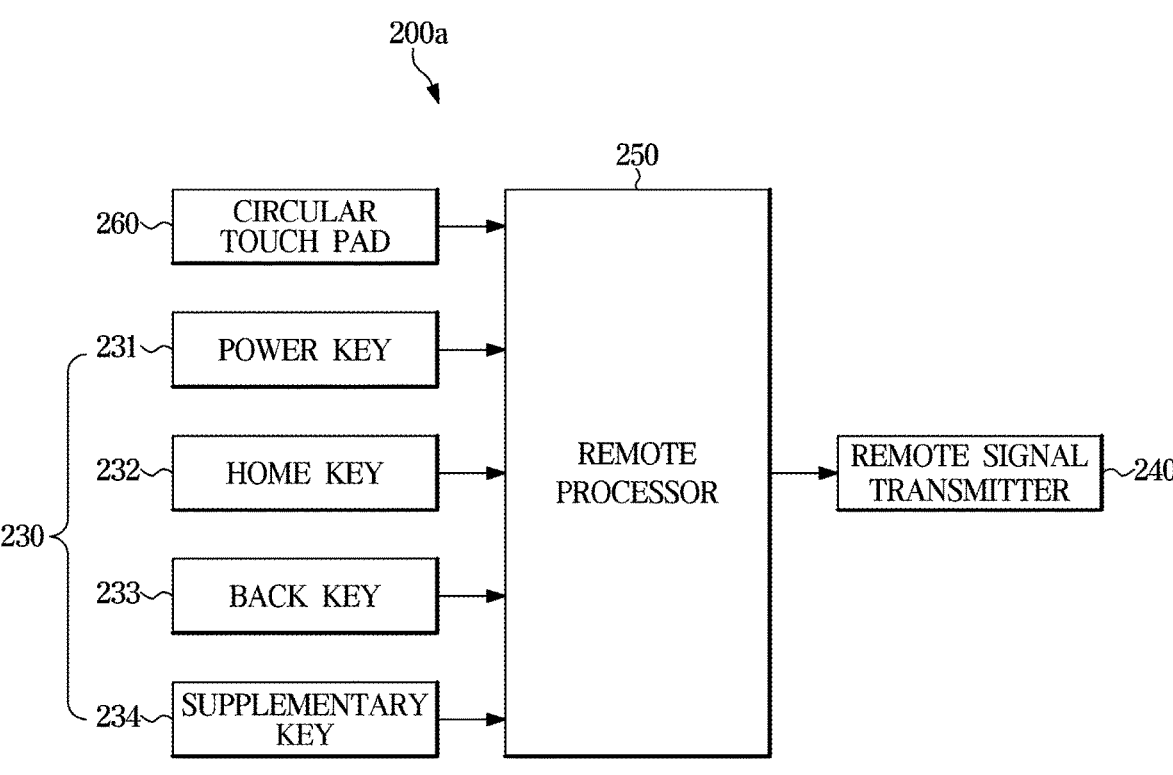
FIG. 26 illustrates a configuration of an external input device included in a display apparatus, according to an embodiment.
Figure 27:
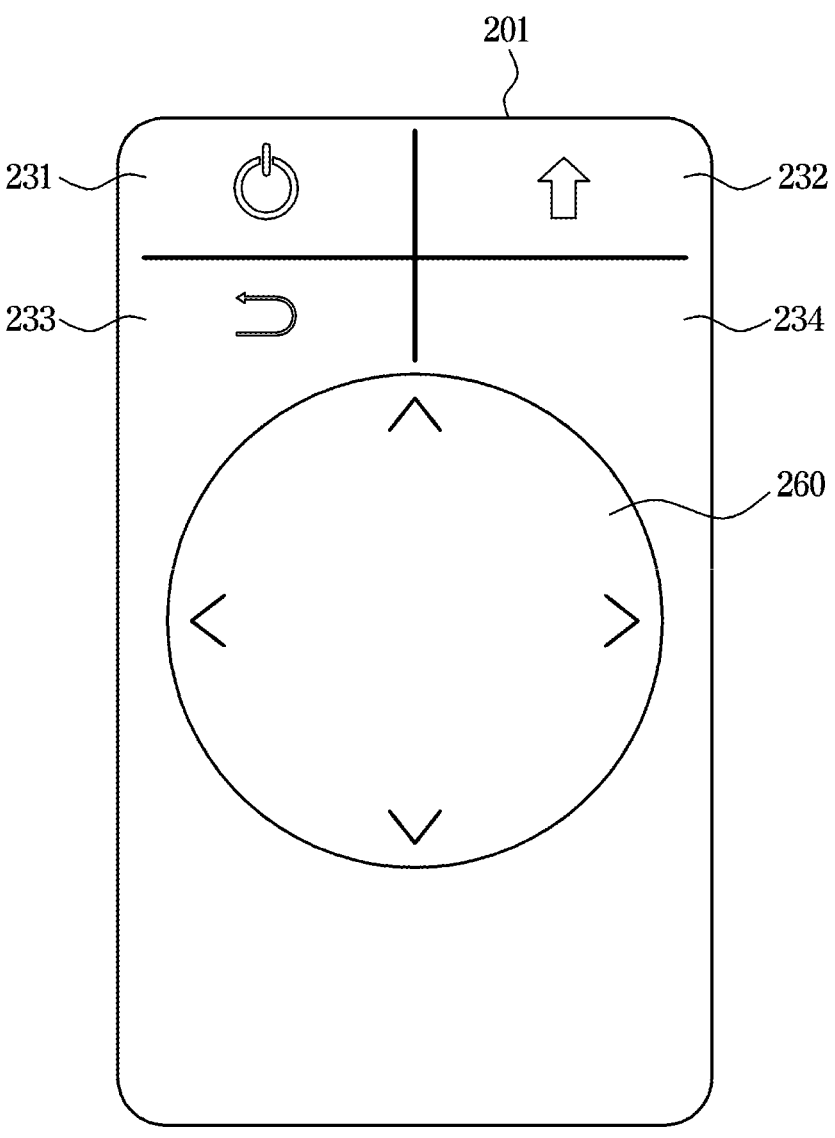
FIG. 27 illustrates a button layout on an external input device included in a display apparatus, according to an embodiment.

FIG. 26 illustrates a configuration of an external input device included in a display apparatus, according to an embodiment. FIG. 27 illustrates a button layout on an external input device included in a display apparatus, according to an embodiment.

As shown in FIGS. 26 and 27, the external input device 200a may include a circular touch pad 260, the plurality of function keys 230, the remote signal transmitter 240, and the remote processor 250. The external input device 200 may further include the main body 201 that accommodates the circular touch pad 260, the remote signal transmitter 240, and the remote processor 250.

The plurality of function keys 230 and the remote signal transmitter 240 may be equivalent to the plurality of function keys and the remote signal transmitter as shown in FIGS. 3 and 4, so the description thereof will not be repeated.

The circular touch pad 260 may detect a touch of the user on the touch pad and provide an electric signal that represents coordinates of the detected touch to the remote processor 250.

For example, the circular touch pad 260 may detect a touch of the user on the circular touch pad 260 from a change in electric resistance or capacitance and output an electric signal corresponding to coordinates of a touch point of the user to the remote processor 250. The remote processor 250 may identify the coordinates of the touch point of the user based on the electric signal received from the circular touch pad 260. Furthermore, the circular touch pad 260 may identify a user input based on the coordinates of the touch point of the user.

The circular touch pad 260 may employ a resistive touch panel or a capacitive touch panel. The circular touch pad 260 is not, however, limited thereto, and the circular touch pad 260 may include various touch pads capable of detecting a touch or approach of the user and outputting an electric signal corresponding to coordinates of the detected touch point or approaching point.

The touch input on the circular touch pad 260 is not allocated a unique user input, but may be allocated a dynamic user input depending on an operation state of the display apparatus 100.

The circular touch pad 260 may replace the plurality of directional keys and the control knob as shown in FIGS. 3 and 4.

A user input of operating the center key as shown in FIGS. 3 and 4 may be replaced by a touch input of the user on a center portion of the circular touch pad 260. A user input of operating the up key as shown in FIGS. 3 and 4 may be replaced by a touch input of the user on an upper portion of the circular touch pad 260. A user input of operating the down key as shown in FIGS. 3 and 4 may be replaced by a touch input of the user on a lower portion of the circular touch pad 260. A user input of operating the right key as shown in FIGS. 3 and 4 may be replaced by a touch input of the user on a right portion of the circular touch pad 260. A user input of operating the left key as shown in FIGS. 3 and 4 may be replaced by a touch input of the user on a left portion of the circular touch pad 260.

Furthermore, a user input of rotating the control knob clockwise as shown in FIGS. 3 and 4 may be replaced by a touch input of a clockwise movement along inner edges of the circular touch pad 260. For example, the remote processor 250 may obtain a user input that represents an increase in physical quantity to be controlled based on the touch input of the clockwise movement along the inner edges of the circular touch pad 260.

A user input of rotating the control knob counterclockwise as shown in FIGS. 3 and 4 may be replaced by a touch input of a counterclockwise movement along inner edges of the circular touch pad 260. For example, the remote processor 250 may obtain a user input that represents a decrease in physical quantity to be controlled based on the touch input of the counterclockwise movement along the inner edges of the circular touch pad 260.

The remote processor 250 may receive an electric signal from the circular touch pad 260 and process the received electric signal. Furthermore, the remote processor 250 may provide a remote control signal to the remote signal transmitter 240 based on the processing of the received electric signal.

The display apparatus 100 may control the display device 150 based on a user input through the circular touch pad 260. For example, the display apparatus 100 may perform the operations as described above in connection with FIGS. 5 to 25 based on the user input through the circular touch pad 260.

According to the disclosure, a display apparatus including a remote control device equipped with a control knob and four-directional keys arranged in the middle of the control knob, and a method for controlling the display apparatus may be provided.

The embodiments of the disclosure may be implemented in the form of a recording medium for storing instructions to be carried out by a computer. The instructions may be stored in the form of program codes, and when executed by a processor, may generate program modules to perform operation in the embodiments of the disclosure. The recording media may correspond to computer-readable recording media.

The computer-readable recording medium includes any type of recording medium having data stored thereon that may be thereafter read by a computer. For example, it may be a read only memory (ROM), a random access memory (RAM), a magnetic tape, a magnetic disk, a flash memory, an optical data storage device, etc.

The machine-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a storage medium (e.g., a compact disc read only memory (CD-ROM)), through an application store (e.g., Play Store™), directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

The embodiments of the disclosure have thus far been described with reference to accompanying drawings. It will be obvious to people of ordinary skill in the art that the present disclosure may be practiced in other forms than the embodiments as described above without changing the technical idea or essential features of the present disclosure. The above embodiments are only by way of example, and should not be interpreted in a limited sense.

What is claimed is:

1. A display apparatus comprising:
   a display;
   a receiver configured to receive a signal from an external input device including a control knob;
   at least one memory storing instructions; and at least one processor electrically connected to the display and the receiver, and which executes the stored instructions, wherein the at least one processor is configured to:

display a first content image on the display, display a first guide image indicating a rotation of the control knob of the external input device and a second guide image indicating a size of the displayed first content image on the display, the first guide image and the second guide image being mapped to the rotation of the control knob, based on the received signal corresponding to a user input which is input through the external input device, and change the size of the displayed first content image and display the second guide image indicating the changed size of the displayed first content image on the display, based on the signal corresponding to the rotation of the control knob of the external input device.

2. The display apparatus of claim 1, wherein the at least one processor is further configured to:

scale down the first content image displayed on the display and display the scaled-down size of the first content image on the display, based on the received signal corresponding to a first directional rotation of the control knob of the external input device, and scale up the first content image and display the scaled-up size of the first content image on the display, based on the received signal corresponding to a second directional rotation of the control knob of the external input device.

3. The display apparatus of claim 2, wherein the at least one processor is further configured to:

display a second content image by not overlapping with the first content image on the display, and scale up the first content image and scale down the second content image so that the first content image does not overlap the second content image, based on the received signal corresponding to the second directional rotation of the control knob of the external input device.

4. The display apparatus of claim 2, wherein the at least one processor further is configured to:

display a second content image by not overlapping with the first content image on the display, and scale up the first content image so that the first content image overlaps with the second content image, based on the received signal corresponding to the second directional rotation of the control knob of the external input device.

5. The display apparatus of claim 1, wherein the at least one processor is further configured to:

move down the first content image based on the received signal corresponding to a first directional rotation of the control knob of the external input device, and move up the first content image based on the received signal corresponding to a second directional rotation of the control knob of the external input device.

6. The display apparatus of claim 5, wherein the at least one processor is further configured to:

display a second content image by not overlapping with the first content image on the display, and move the first content image and scale down the second content image so that the first content image does not overlap the second content image, based on the received signal corresponding to a rotation of the control knob of the external input device.

7. The display apparatus of claim 5, wherein the at least one processor is further configured to:

display a second content image not overlapping with the first content image on the display, and move the first content image so that the first content image overlaps with the second content image, based on the received signal corresponding to a rotation of the control knob of the external input device.

8. The display apparatus of claim 1, wherein the at least one processor is further configured to:

display at least one of a plurality of directional keys included in the external input device and an aspect ratio of the first content image on the display, based on the received signal corresponding to the user input which is input through the external input device, and change the aspect ratio of the first content image and display the changed aspect ratio of the first content image on the display, based on the received signal corresponding to at least one input of the plurality of directional keys of the external input device.

9. The display apparatus of claim 1, wherein the at least one processor is further configured to:

display a multi-view guide for displaying a plurality of content images on the display, based on the received signal corresponding to at least one input of a plurality of directional keys included in the external input device, and the multi-view guide includes a plurality of source images associated with a plurality of content sources, respectively.

10. The display apparatus of claim 9, wherein the at least one processor is further configured to:

display a second content image by not overlapping with the first content image, based on the received signal corresponding to a source image selected from among the plurality of source images.

11. The display apparatus of claim 1, wherein the at least one processor is further configured to:

display the first content image received from a first content source on the display, and display a second content image received from a second content source by not overlapping with the first content image on the display, based on the received signal corresponding to the received signal corresponding to a connection to the second content source.

12. The display apparatus of claim 1, wherein the at least one processor is further configured to:

move the first content image up, down, to a right side or to a left side, based on the received signal corresponding to at least one input of a plurality of directional keys included in the external input device.

13. The display apparatus of claim 1, wherein the at least one processor is further configured to:

display a parameter guide for modifying an image parameter of the first content image based on the received signal corresponding to at least one input of a plurality of directional keys included in the external input device, and the parameter guide includes a plurality of parameter guides associated with a plurality of image parameters, respectively.

14. The display apparatus of claim 13, wherein the at least one processor is further configured to:

change a setting value of each of the plurality of parameter guides based on the received signal corresponding to a rotation of the control knob of the external input device.

15. A method of controlling a display apparatus which receives a signal from an external input device including a control knob, the method comprising:

displaying, by at least one processor of the display apparatus, a first content image received from a first content source;

displaying a first guide image indicating a rotation of the control knob of the external input device and a second guide image indicating a size of the displayed first content image, the first guide image and the second guide image being mapped to the rotation of the control knob, based on the received signal corresponding to a user input which is input through the external input device; and changing the size of the displayed first content image and displaying the second guide image indicating the changed size of the displayed first content image, based on the received signal corresponding to the rotation of the control knob of the external input device.

16. A display apparatus comprising:

a display;

a receiver configured to receive a signal from an external input device including a circular touch pad;

30 at least one memory storing instructions; and at least one processor electrically connected to the display and the receiver, and which executes the stored instructions, wherein the at least one processor is configured to control the display to:

display a first content image on the display, display a first guide image indicating a rotation of a control knob corresponding to the circular touch pad of the external input device and a second guide image indicating a size of the displayed first content image on the display, the first guide image and the second guide image being mapped to the rotation of the control knob, based on the received signal corresponding to a user input which is input through the external input device, and change the size of the displayed first content image and display the second guide image indicating the changed size of the displayed first content image on the display, based on the received signal corresponding to a touch input of rotating along inner edges of the circular touch pad.

* * * * *